United States Patent
Björkman et al.

(10) Patent No.: US 10,384,671 B2
(45) Date of Patent: Aug. 20, 2019

(54) METHOD FOR STARTING A COMBUSTION ENGINE IN A HYBRID DRIVELINE

(71) Applicant: Scania CV AB, Södertälje (SE)

(72) Inventors: Mathias Björkman, Tullinge (SE);
Niklas Pettersson, Stockholm (SE);
Johan Lindström, Nyköping (SE);
Mikael Bergquist, Huddinge (SE)

(73) Assignee: Scania CV AB, Södertälje (SE)

( * ) Notice: Subject to any disclaimer, the term of this patent is extended or adjusted under 35 U.S.C. 154(b) by 272 days.

(21) Appl. No.: 15/124,845

(22) PCT Filed: Mar. 17, 2015

(86) PCT No.: PCT/SE2015/050309
§ 371 (c)(1),
(2) Date: Sep. 9, 2016

(87) PCT Pub. No.: WO2015/142269
PCT Pub. Date: Sep. 24, 2015

(65) Prior Publication Data
US 2017/0015310 A1    Jan. 19, 2017

(30) Foreign Application Priority Data

Mar. 20, 2014 (SE) ...................................... 1450319

(51) Int. Cl.
*B60L 9/00* (2019.01)
*B60W 20/40* (2016.01)
(Continued)

(52) U.S. Cl.
CPC .............. *B60W 20/40* (2013.01); *B60K 6/26* (2013.01); *B60K 6/365* (2013.01); *B60K 6/387* (2013.01);
(Continued)

(58) Field of Classification Search
CPC ............ H04B 7/18578; H04B 7/18595; H04B 7/18517; H04W 4/026; H04W 4/027;
(Continued)

(56) References Cited

U.S. PATENT DOCUMENTS 3,226,513 A    12/1965  Frowein et al.
5,591,097 A    1/1997   Petri et al.
(Continued)

FOREIGN PATENT DOCUMENTS

DE    19903936 A1    5/2000
DE    19950679 A1    4/2001
(Continued)

OTHER PUBLICATIONS

International Search Report for PCT/SE2015/050309 dated Jun. 29, 2015.
(Continued)

*Primary Examiner* — Shardul D Patel
(74) *Attorney, Agent, or Firm* — Moore & Van Allen PLLC; W. Kevin Ransom

(57) ABSTRACT

A method is provided to start a combustion engine in a hybrid powertrain, comprising a gearbox with input and output shafts; a first planetary gear, connected to the input shaft and a first main shaft; a second planetary gear connected to the first planetary gear and a second main shaft; first and second electrical machines respectively connected to the first and second planetary gears; one gear pair connected with the first main shaft, and therefore with the first planetary gear and the output shaft; and one gear pair connected with the second main shaft. The method comprises: a) connecting an output shaft of the combustion engine with the input shaft of the gearbox, via a coupling
(Continued)

device arranged between the output shaft and the input shaft; and b) controlling the first and second electrical machines to start the combustion engine.

13 Claims, 6 Drawing Sheets

(51) Int. Cl.
| | |
|---|---|
| B60K 6/365 | (2007.10) |
| B60K 6/547 | (2007.10) |
| B60W 10/02 | (2006.01) |
| B60W 10/06 | (2006.01) |
| B60W 10/08 | (2006.01) |
| F16H 37/04 | (2006.01) |
| F02N 11/00 | (2006.01) |
| F02N 15/04 | (2006.01) |
| B60K 6/26 | (2007.10) |
| B60K 6/387 | (2007.10) |
| B60K 6/44 | (2007.10) |
| B60W 10/111 | (2012.01) |
| F16H 3/72 | (2006.01) |
| B60K 6/445 | (2007.10) |
| B60W 10/11 | (2012.01) |
| F16H 3/00 | (2006.01) |
| B60W 30/19 | (2012.01) |
| B60W 20/00 | (2016.01) |

(52) U.S. Cl.
CPC ............... *B60K 6/44* (2013.01); *B60K 6/445* (2013.01); *B60K 6/547* (2013.01); *B60W 10/02* (2013.01); *B60W 10/06* (2013.01); *B60W 10/08* (2013.01); *B60W 10/11* (2013.01); *B60W 10/111* (2013.01); *F02N 11/006* (2013.01); *F02N 15/046* (2013.01); *F16H 3/728* (2013.01); *F16H 37/042* (2013.01); *F16H 37/046* (2013.01); *B60K 2006/266* (2013.01); *B60W 20/00* (2013.01); *B60W 30/19* (2013.01); *B60Y 2200/92* (2013.01); *B60Y 2300/19* (2013.01); *B60Y 2300/42* (2013.01); *B60Y 2300/70* (2013.01); *F02N 2300/104* (2013.01); *F16H 2003/008* (2013.01); *F16H 2200/2007* (2013.01); *Y02T 10/6239* (2013.01); *Y02T 10/6286* (2013.01); *Y10S 903/911* (2013.01); *Y10S 903/93* (2013.01); *Y10S 903/945* (2013.01); *Y10S 903/946* (2013.01)

(58) Field of Classification Search
CPC ......... H04W 4/14; H04W 24/10; H04W 4/02; H04L 43/045; H04L 67/34; H01Q 1/1257; B60W 20/10; B60W 10/115; B60W 10/08; B60W 20/00; B60W 10/06; F16H 37/042; B60K 1/02
USPC .......... 701/22, 54; 477/3, 5; 123/2; 903/930, 903/945; 180/65.265; 475/5, 209; 290/32
See application file for complete search history.

(56) References Cited

U.S. PATENT DOCUMENTS

| | | | |
|---|---|---|---|
| 5,730,676 A | 3/1998 | Schmidt | |
| 5,980,410 A | 11/1999 | Stemler et al. | |
| 6,306,057 B1 | 10/2001 | Morisawa et al. | |
| 6,558,283 B1* | 5/2003 | Schnelle | B60K 6/36 180/65.235 |
| 6,655,485 B1* | 12/2003 | Ito | B60W 20/40 180/65.6 |
| 6,740,002 B1* | 5/2004 | Stridsberg | B60K 6/405 477/14 |
| 6,805,648 B1 | 10/2004 | Ehrlinger | |
| 7,034,481 B2 | 4/2006 | Imai | |
| 7,479,081 B2 | 1/2009 | Holmes | |
| 7,500,933 B2 | 3/2009 | Baasch et al. | |
| 7,575,529 B2 | 8/2009 | Holmes | |
| 7,931,102 B2 | 4/2011 | Katsuta et al. | |
| 8,047,314 B2 | 11/2011 | Oba et al. | |
| 8,091,661 B2 | 1/2012 | Oba et al. | |
| 8,100,207 B2 | 1/2012 | Oba et al. | |
| 8,122,983 B2 | 2/2012 | Katsuta et al. | |
| 8,210,296 B2 | 7/2012 | Katsuta et al. | |
| 8,215,426 B2 | 7/2012 | Katsuta et al. | |
| 8,226,513 B2 | 7/2012 | Abe et al. | |
| 8,231,491 B2 | 7/2012 | Oba et al. | |
| 8,251,165 B2 | 8/2012 | Katsuta et al. | |
| 8,272,991 B2 | 9/2012 | Katsuta et al. | |
| 8,398,515 B2 | 3/2013 | Sartre et al. | |
| 9,145,959 B2 | 9/2015 | Otten | |
| 9,541,167 B2 | 1/2017 | Lindström et al. | |
| 9,562,592 B2 | 2/2017 | Rekow et al. | |
| 9,770,969 B2 | 9/2017 | Björkman et al. | |
| 2001/0048226 A1 | 12/2001 | Nada | |
| 2002/0045507 A1 | 4/2002 | Bowen | |
| 2002/0088288 A1 | 7/2002 | Bowen | |
| 2002/0148659 A1 | 10/2002 | Bordini | |
| 2003/0013569 A1 | 1/2003 | Doepke | |
| 2003/0100395 A1 | 5/2003 | Hiraiwa | |
| 2003/0166429 A1 | 9/2003 | Tumback | |
| 2004/0077448 A1 | 4/2004 | Oshidari et al. | |
| 2004/0082419 A1 | 4/2004 | Randall | |
| 2005/0072609 A1 | 4/2005 | Eisenhardt et al. | |
| 2005/0102082 A1 | 5/2005 | Joe et al. | |
| 2005/0126836 A1 | 6/2005 | Bischoff | |
| 2005/0221943 A1 | 10/2005 | Kuhstrebe | |
| 2005/0227803 A1 | 10/2005 | Holmes | |
| 2005/0256629 A1 | 11/2005 | Tao et al. | |
| 2007/0087894 A1 | 4/2007 | Tsuneyoshi et al. | |
| 2007/0099738 A1* | 5/2007 | Holmes | B60K 6/40 475/5 |
| 2007/0125083 A1 | 6/2007 | Rollinger et al. | |
| 2007/0243966 A1 | 10/2007 | Holmes et al. | |
| 2008/0064550 A1 | 3/2008 | Holmes | |
| 2008/0103002 A1* | 5/2008 | Holmes | B60K 6/365 475/5 |
| 2008/0109139 A1* | 5/2008 | Muta | B60W 10/115 701/48 |
| 2008/0224478 A1 | 9/2008 | Tamor | |
| 2008/0245167 A1 | 10/2008 | Gitt | |
| 2008/0254932 A1 | 10/2008 | Heinzelmann | |
| 2008/0269000 A1 | 10/2008 | Abe et al. | |
| 2008/0300082 A1 | 12/2008 | Abe | |
| 2009/0037060 A1* | 2/2009 | Carlhammar | B60K 6/387 701/54 |
| 2009/0076693 A1 | 3/2009 | Kumazaki et al. | |
| 2009/0076694 A1 | 3/2009 | Tabata et al. | |
| 2009/0118925 A1 | 5/2009 | Hsieh et al. | |
| 2009/0236160 A1 | 9/2009 | Tanaka et al. | |
| 2009/0320629 A1 | 12/2009 | Akashi et al. | |
| 2010/0000814 A1 | 1/2010 | Katsuta et al. | |
| 2010/0006360 A1 | 1/2010 | Kishimoto | |
| 2010/0012405 A1 | 1/2010 | Katsuta et al. | |
| 2010/0023436 A1 | 1/2010 | Weild, IV | |
| 2010/0029428 A1* | 2/2010 | Abe | B60K 6/365 475/5 |
| 2010/0029436 A1 | 2/2010 | Katsuta et al. | |
| 2010/0045220 A1 | 2/2010 | Yamada et al. | |
| 2010/0051360 A1 | 3/2010 | Oba et al. | |
| 2010/0051361 A1 | 3/2010 | Katsuta et al. | |
| 2010/0078238 A1 | 4/2010 | Oba et al. | |
| 2010/0125019 A1 | 5/2010 | Tabata et al. | |
| 2011/0294620 A1* | 12/2011 | Pruitt | B60K 6/48 477/5 |
| 2011/0300983 A1 | 12/2011 | Kurokawa | |

(56) References Cited

U.S. PATENT DOCUMENTS

| | | | |
|---|---|---|---|
| 2011/0312463 A1* | 12/2011 | Park | B60K 6/365 475/5 |
| 2012/0040794 A1 | 2/2012 | Schoolcraft | |
| 2012/0197475 A1 | 8/2012 | Akutsu et al. | |
| 2012/0226401 A1 | 9/2012 | Naito | |
| 2012/0270698 A1 | 10/2012 | Hisada et al. | |
| 2013/0006489 A1 | 1/2013 | Kim | |
| 2013/0023379 A1 | 1/2013 | Bucknor et al. | |
| 2013/0063061 A1 | 3/2013 | Hanada | |
| 2013/0190132 A1 | 7/2013 | Izawa | |
| 2013/0233268 A1 | 9/2013 | Yamaguchi et al. | |
| 2013/0260936 A1 | 10/2013 | Takei et al. | |
| 2013/0261863 A1 | 10/2013 | Noguchi | |
| 2013/0324347 A1 | 12/2013 | Lewton et al. | |
| 2013/0345007 A1 | 12/2013 | Wenthen | |
| 2013/0345009 A1 | 12/2013 | Iwasa | |
| 2014/0033843 A1 | 2/2014 | Van Druten et al. | |
| 2014/0094336 A1 | 4/2014 | Versteyhe et al. | |
| 2014/0121054 A1 | 5/2014 | Bergquist et al. | |
| 2014/0128206 A1 | 5/2014 | Noh et al. | |
| 2014/0162823 A1 | 6/2014 | Choi et al. | |
| 2014/0162832 A1 | 6/2014 | Noh et al. | |
| 2014/0174231 A1 | 6/2014 | Beirinckx et al. | |
| 2014/0256493 A1 | 9/2014 | Knoblauch | |
| 2014/0371023 A1 | 12/2014 | Janson | |
| 2014/0371025 A1 | 12/2014 | Oita et al. | |
| 2015/0072819 A1 | 3/2015 | Ono et al. | |
| 2015/0183423 A1 | 7/2015 | Yamamoto et al. | |
| 2015/0197146 A1* | 7/2015 | Vagstedt | B60K 6/48 475/5 |
| 2015/0203097 A1* | 7/2015 | Pettersson | B60K 6/365 477/4 |
| 2015/0299984 A1 | 10/2015 | Mattsson et al. | |
| 2015/0300456 A1 | 10/2015 | Lichtenegger | |
| 2015/0345629 A1 | 12/2015 | Liu | |
| 2015/0375734 A1 | 12/2015 | Pettersson et al. | |
| 2016/0003341 A1 | 1/2016 | Sieveking et al. | |
| 2016/0046180 A1 | 2/2016 | Hwang et al. | |
| 2016/0047441 A1 | 2/2016 | Björkman et al. | |
| 2016/0053863 A1 | 2/2016 | Glover et al. | |
| 2016/0053864 A1 | 2/2016 | Lindström et al. | |
| 2016/0061297 A1 | 3/2016 | Lindström et al. | |
| 2016/0091063 A1 | 3/2016 | Rekow et al. | |
| 2016/0131227 A1 | 5/2016 | Beck et al. | |
| 2016/0138466 A1* | 5/2016 | Ge | F02B 61/06 60/624 |
| 2017/0008510 A1 | 1/2017 | Imamura et al. | |
| 2017/0015299 A1 | 1/2017 | Björkman et al. | |
| 2017/0015303 A1 | 1/2017 | Björkman et al. | |
| 2017/0015325 A1 | 1/2017 | Lindström et al. | |
| 2017/0028982 A1 | 2/2017 | Björkman et al. | |
| 2017/0291607 A1 | 10/2017 | Bergquist et al. | |

FOREIGN PATENT DOCUMENTS

| | | |
|---|---|---|
| DE | 10052393 A1 | 5/2002 |
| DE | 102006025525 A1 | 12/2007 |
| DE | 102007022129 A1 | 11/2008 |
| DE | 102008043732 A1 | 6/2009 |
| DE | 102008032320 A1 | 1/2010 |
| DE | 102009000723 A1 | 8/2010 |
| DE | 102010029597 A1 | 12/2011 |
| EP | 1199204 A1 | 4/2002 |
| EP | 1275547 A2 | 1/2003 |
| EP | 1280677 A1 | 8/2004 |
| EP | 1126987 A1 | 8/2005 |
| EP | 1157873 A2 | 2/2006 |
| EP | 2113434 A1 | 11/2009 |
| JP | 2011084116 A | 4/2011 |
| WO | 0183249 A2 | 11/2001 |
| WO | 2008046185 A1 | 4/2008 |
| WO | 2008081893 A1 | 7/2008 |
| WO | 2009024162 A1 | 2/2009 |
| WO | 2009047540 A1 | 4/2009 |
| WO | 2012055527 A1 | 5/2012 |
| WO | 2012073651 A1 | 6/2012 |
| WO | 2013076566 A1 | 5/2013 |
| WO | 2013088568 A1 | 6/2013 |
| WO | 2013177783 A1 | 12/2013 |
| WO | 2014046580 A1 | 3/2014 |

OTHER PUBLICATIONS

Written Opinion of the International Search Authority for PCT/SE2015/050309 dated Jun. 29, 2015.

European Search Report for PCT/SE2015/050309 dated Oct. 30, 2017.

* cited by examiner

METHOD FOR STARTING A COMBUSTION ENGINE IN A HYBRID DRIVELINE

CROSS-REFERENCE TO RELATED REFERENCE(S)

This application is a national stage application (filed under 35 § U.S.C. 371) of PCT/SE15/050309, filed Mar. 17, 2015 of the same title, which, in turn claims priority to Swedish Application No. 1450319-7, filed Mar. 20, 2014 of the same title; the contents of each of which are hereby incorporated by reference.

FIELD OF THE INVENTION

The present invention relates to a method, vehicle, and computer program product to start a combustion engine.

BACKGROUND OF THE INVENTION

Hybrid vehicles may be driven by a primary engine, which may be a combustion engine, and a secondary engine, which may be an electrical machine. The electrical machine is equipped with at least one energy storage device, such as an electro-chemical energy storage device, for storage of electric power and control equipment to control the flow of electric power between the energy storage device and the electrical machine. The electrical machine may thus alternately operate as a motor and as a generator, depending on the vehicle's operating mode. When the vehicle is braked, the electrical machine generates electric power, which is stored in the energy storage device. This is usually referred to as regenerative braking, which entails that the vehicle is decelerated with the help of the electrical machine and the combustion engine. The stored electric power is used later for operation of the vehicle.

A gearbox in a hybrid vehicle may comprise a planetary gear. The planetary gearbox usually comprises three components, which are rotatably arranged in relation to each other, namely a sun wheel, a planetary wheel carrier and an internal ring gear. With knowledge about the number of cogs in the sun wheel and the internal ring gear, the mutual speeds of the three components may be determined during operation. One of the components of the planetary gear may be connected with an output shaft in a combustion engine. This component of the planetary gear thus rotates with a rotational speed corresponding to the rotational speed of the output shaft in the combustion engine. A second component in the planetary gear may be connected with an input shaft to a transmission device. This component of the planetary gear thus rotates with the same rotational speed as the input shaft to the transmission device. A third component in the planetary gear is used to achieve hybrid operation, connected with a rotor in an electrical machine. This component in the planetary gear thus rotates with the same rotational speed as the rotor of the electrical machine, if they are directly connected with each other. Alternatively, the electrical machine may be connected with the third component of the planetary gear via a transmission that has a gearing. In this case, the electrical machine and the third component in the planetary gear may rotate with different rotational speeds. The engine speed and/or the torque of the electrical machine may be controlled steplessly. During operating times when the input shaft to the transmission device must be provided with a rotational engine speed and/or torque, a control device having knowledge about the engine speed of the combustion engine calculates the rotational speed with which the third component must be operated, in order for the input shaft to the transmission device to obtain the desired rotational speed. A control device activates the electrical machine, so that it provides the third component with the calculated engine speed and thus the input shaft to the transmission device with the desired rotational speed.

By connecting the combustion engine's output shaft, the electrical machine's rotor and the transmission device's input shaft with a planetary gear, the conventional clutch mechanism may be avoided. At acceleration of the vehicle, an increased torque must be delivered from the combustion engine and the electrical machine to the transmission device, and further to the vehicle's driving wheels. Since both the combustion engine and the electrical machine are connected with the planetary gear, the largest possible torque delivered by the combustion engine and the electrical machine will be limited by one of these drive units; i.e. the one whose maximum torque is lower than the second drive unit's maximum torque, having regard to the gearing between them. In case the electrical machine's highest torque is lower than the combustion engine's highest torque, having regard to the gearing between them, the electrical machine will not be able to generate a sufficiently large reaction torque to the planetary gear, entailing that the combustion engine may not transfer its highest torque to the transmission device and further to the vehicle's driving wheels. Thus, the highest torque that may be transferred to the gearbox is limited by the electrical machine's strength. This is also apparent from the so-called planet equation.

Using a conventional clutch, which disconnects the gearbox's input shaft from the combustion engine during shifting processes in the gearbox, entails disadvantages, such as heating of the clutch's discs, resulting in wear of the clutch discs and an increased fuel consumption. A conventional clutch mechanism is also relatively heavy and costly. It also occupies a relatively large space in the vehicle.

In a vehicle, the space available for the drive arrangement is often limited. If the drive arrangement comprises several components, such as a combustion engine, an electrical machine, a gearbox and a planetary gear, the construction must be compact. If there are additional components, such as a regenerative braking device, the requirements that the component parts must have a compact construction are even more stringent. At the same time, the component parts in the drive arrangement must be designed with dimensions that are able to absorb the required forces and torque.

For some types of vehicles, especially heavy goods vehicles and buses, a large number of gear steps is required. Thus, the number of component parts in the gearbox increases, which must also be dimensioned to be able to absorb large forces and torque arising in such heavy goods vehicles. This results in an increase of the size and weight of the gearbox.

There are also requirements for high reliability and high dependability of the components comprised in the drive device. In case the gearbox comprises multi-plate clutches, a wear arises, which impacts the reliability and life of the gearbox.

At regenerative braking, kinetic energy is converted into electric power, which is stored in an energy storage device, such as accumulators. One factor impacting on the life of the energy storage device is the number of cycles in which the energy storage device provides and extracts power to and from the electric machines. The more cycles, the shorter the life of the energy storage device.

Under some operating conditions, it is desirable to shut off the combustion engine, with the objective of saving fuel and to avoid cooling down of the combustion engine's exhaust treatment system. When a torque injection is required in the hybrid powertrain, or when the energy storage device must be charged, the combustion engine must be started quickly and efficiently.

The document EP-B1-1126987 shows a gearbox with double planetary gears. Each sun wheel of the planetary gear is connected to an electrical machine, and the internal wheels of the planetary gears are connected with each other. The planetary wheel carrier in each planetary gear is connected to a number of gear pairs, so that an infinite number of gear steps is obtained. Another document, EP-B1-1280677, also shows how the planetary gears may be bridged with a gear step arranged on the combustion engine's output shaft.

The document US-A1-20050227803 shows a vehicle transmission with two electric machines, connected to the respective sun wheels in two planetary gears. The planetary gears have a common planetary wheel carrier, which is connected to the transmission's input shaft.

The document WO2008/046185-A1 shows a hybrid transmission with two planetary gears, wherein one electrical machine is connected to one of the planetary gears and a double clutch interacts with the second planetary gear. Both planetary gears also interact with each other via a cogwheel transmission.

SUMMARY OF THE INVENTION

Despite prior art solutions in the field, there is a need to further develop a method to start a combustion engine in a hybrid powertrain.

The objective of this invention is to provide a novel and advantageous method to start a combustion engine in a hybrid powertrain.

Another objective of this invention is to provide a novel and advantageous method to start a combustion engine in a hybrid powertrain, when the combustion engine is disconnected.

Another objective of the invention is to provide a novel and advantageous computer program to start a combustion engine.

With the method according to the invention, an efficient and reliable start of the combustion engine is obtained when the first and/or the second electrical machine achieves a desired torque in the output shaft from the gearbox. Such an operating mode may occur when the hybrid powertrain is arranged in a vehicle, and when the vehicle is driven by the first and/or the second electrical machine. The combustion engine may be shut off with the objective of saving fuel, or to avoid cooling down of the combustion engine's exhaust after treatment system. If a torque injection is required in the hybrid powertrain when the vehicle is driven, or when the energy storage device must be charged, the combustion engine may be started quickly and efficiently by balancing the first and the second electrical machine, in such a way that the desired torque in the output shaft and the required torque to start the combustion engine are achieved. The gearbox comprises an input shaft and an output shaft, a first planetary gear, which is connected to the input shaft, a second planetary gear, which is connected to the first planetary gear, a first electrical machine, connected to the first planetary gear, a second electrical machine, connected to the second planetary gear, at least one gear pair connected with the first planetary gear and the output shaft, and at least one gear pair connected with the second planetary gear and the output shaft.

An output shaft in the combustion engine is suitably connected with a first planetary wheel carrier in the first planetary gear via the input shaft of the gearbox, which first planetary wheel carrier is connected with a second sun wheel in the second planetary gear. Furthermore, a first sun wheel in the first planetary gear is fixedly connected with a first main shaft, and a second planetary wheel carrier in the second planetary gear is fixedly connected with a second main shaft.

It is important that the combustion engine's output shaft is as still as possible during electric operation, when the combustion engine is switched off. If torque is transferred to the combustion engine when it is switched off, there is a risk that the shafts of the combustion engine move toward bearings without any supply of oil, which may result in wear and the eventual destruction of the bearings. The output shaft of the combustion engine is suitably kept still by disconnecting the output shaft from the input shaft of the gearbox via a coupling device, arranged between the output shaft of the combustion engine and the input shaft of the gearbox. When the coupling device is open, the combustion engine is thus disconnected from the input shaft of the gearbox, and when the coupling device is closed, the combustion engine is connected with the input shaft of the gearbox.

During electric operation, the need to shift gears is reduced when the first and the second electrical machines each has a greater engine speed range, within which they operate effectively, compared to the combustion engine. Both the first and the second electrical machine preferably operates the vehicle in a forward direction during electric operation, which results in a large number of possible combinations of different gear steps.

Shifting gears during electric operation means that the torque injection from one electrical machine must always be reduced during the shifting, in order to connect or disconnect any gear pair from a countershaft connected with the output shaft, and thus engage a gear.

During electric operation, the combustion engine suitably is disconnected via a coupling device, arranged between the output shaft of the combustion engine and the input shaft of the gearbox, while simultaneously the first planetary wheel carrier is connected with the first sun wheel, and the second planetary wheel carrier is connected with the second sun wheel. A gear pair connected with the first planetary gear is connected to the countershaft, and a gear pair connected with the second planetary gear is disconnected from the countershaft, or vice versa. In this manner, the first electrical machine and the second electrical machine obtain the same engine speed, which results in a simple load distribution between the first and the second electrical machines.

Alternatively, the combustion engine is disconnected via the coupling device, while at the same time the first planetary wheel carrier is connected with the first sun wheel, and the second planetary wheel carrier is disconnected from the second sun wheel. Alternatively, the first planetary wheel carrier and the first sun wheel are disconnected from each other, and the second planetary wheel carrier and the second sun wheel are connected. A gear pair connected with the first planetary gear is connected to the countershaft, and a gear pair connected with the second planetary gear is also connected with the countershaft.

Alternatively, the combustion engine is disconnected via the coupling device, while at the same time the first planetary wheel carrier and the first sun wheel are disconnected from each other, and the second planetary wheel carrier is disconnected from the second sun wheel. A gear pair connected with the first planetary gear is connected to the countershaft, and a gear pair connected with the second planetary gear is also connected with the countershaft.

The method to start the combustion engine comprises the step of connecting the output shaft in the combustion engine with the input shaft of the gearbox, via the coupling device arranged between the output shaft and the input shaft. The method also comprises the step of controlling the first and the second electrical machine, in such a way that the combustion engine is started.

According to the method, the output shaft in the combustion engine is connected with the input shaft of the gearbox, by way of controlling the first and/or the second electrical machine in such a way that a synchronous rotational speed is achieved between the combustion engine's output shaft and the gearbox's input shaft. Since the combustion engine's output shaft is at a standstill, the first electrical machine is controlled in such a way that the input shaft of the gearbox stops. The synchronous engine speed is thus zero. The second electrical machine is meanwhile controlled in such a way that a desired torque is achieved in the output shaft of the gearbox. Suitably the second electrical machine is controlled in such a way that the first electrical machine may counteract the reaction torque achieved by the second electrical machine, and at the same time achieve a synchronous rotational speed between the combustion engine's output shaft and the gearbox's input shaft. When the input shaft of the gearbox has stopped, the coupling device is controlled in such a way that the output shaft of the combustion engine and the input shaft of the gearbox are connected.

The combustion engine is preferably started by way of controlling the first and the second electrical machines in such a way that a torque, required to start the combustion engine, is achieved on the combustion engine's output shaft at the same time as a predetermined desired torque is achieved on the output shaft of the gearbox. How the first and the second electrical machine, respectively, is controlled, is determined by way of balancing between the desired torque of the output shaft and the required torque to start the combustion engine for the selected gear. With predetermined values for the torque required to start the combustion engine and the desired powertrain torque, it may be determined what torque the first and the second electrical machine, respectively, must achieve. In this way, the combustion engine may be started at the same time as the hybrid powertrain is operated electrically.

According to one embodiment, a first planetary wheel carrier and a first sun wheel, arranged in the first planetary gear are connected, while a second planetary wheel carrier, arranged in the second planetary gear, and a second sun wheel are disconnected. Furthermore, a gear pair connected with the first planetary gear is connected to the countershaft, and a gear pair connected with the second planetary gear is also connected with the countershaft. The method then comprises the step of disconnecting, before the step of connecting the output shaft of the combustion engine with the input shaft of the gearbox, the first planetary wheel carrier and the first sun wheel from each other. Preferably this is achieved by way of controlling the first and/or the second electrical machine in such a way that torque balance is achieved in the first planetary gear, whereat a first coupling devise is shifted, so that the first planetary wheel carrier and the first sun wheel are disconnected from each other.

Torque balance relates to a state where a torque acts on an internal ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, i.e. the sun wheel, the internal ring gear or planetary wheel carriers, are connected with a coupling device, this coupling device does not transfer any torque between the planetary gear's parts when torque balance prevails. Accordingly, the coupling device may easily be shifted and the planetary gear's component parts be disconnected.

According to another embodiment, the first planetary wheel carrier and the first sun wheel are disconnected, while the second planetary wheel carrier and the second sun wheel are connected. Furthermore, a gear pair connected with the first planetary gear is connected to the countershaft, and a gear pair connected with the second planetary gear is also connected with the countershaft. The method then comprises the step of disconnecting, before the step of connecting the output shaft of the combustion engine with the input shaft of the gearbox, the second planetary wheel carrier and the second sun wheel from each other. Preferably this is achieved by way of controlling the first and/or the second electrical machine in such a way that torque balance is achieved in the second planetary gear, wherein a second coupling device is shifted, so that the second planetary wheel carrier and the second sun wheel are disconnected from each other.

According to another embodiment, a first planetary wheel carrier, arranged in the first planetary gear, and a first sun wheel are connected, and a second planetary wheel carrier, arranged in the second planetary gear, and a second sun wheel are also connected. Furthermore, a gear pair connected with the first planetary gear is connected to the countershaft, and the gear pairs connected with the second planetary gear are disconnected from the countershaft. The method then comprises the step of disconnecting, before the step of connecting the output shaft of the combustion engine with the input shaft of the gearbox, the first planetary wheel carrier and the first sun wheel from each other. Preferably this is achieved by way of controlling the first and/or the second electrical machine in such a way that torque balance is achieved in the first planetary gear, whereat a first coupling devise is shifted, so that the first planetary wheel carrier and the first sun wheel are disconnected from each other. The method preferably also comprises, after the combustion engine has been started, connecting a gear pair, which is connected with the second planetary gear, to the countershaft, in order thus to engage a gear and facilitate moving off. Suitably, the connection of the gear pair is carried out by controlling the combustion engine to achieve a synchronous rotational speed between the gear pair connected with the second planetary gear and the countershaft.

According to another embodiment, a first planetary wheel carrier, arranged in the first planetary gear, and a first sun wheel are connected, and a second planetary wheel carrier, arranged in the second planetary gear, and a second sun wheel are also connected. Furthermore, a gear pair connected with the first planetary gear is connected to the countershaft, and the gear pairs connected with the second planetary gear are disconnected from the countershaft. The method then comprises the step of disconnecting, before the step of connecting the output shaft of the combustion engine with the input shaft of the gearbox, the first planetary wheel carrier and the first sun wheel from each other. Preferably this is achieved by way of controlling the first and/or the second electrical machine in such a way that torque balance is achieved in the first planetary gear, whereat a first coupling devise is shifted, so that the first planetary wheel carrier and the first sun wheel are disconnected from each other. Subsequently, a gear pair, which is connected with the second planetary gear, is connected to the countershaft. Suitably, the connection of the gear pair is carried out by controlling the second electrical machine to achieve a synchronous rotational speed between the gear pair connected with the second planetary gear and the countershaft. Subsequently, the second planetary wheel carrier and the second sun wheel are disconnected from each other. Preferably this is achieved by way of controlling the first and/or the second electrical machine in such a way that torque balance is achieved in the second planetary gear, wherein a second coupling device is shifted, so that the second planetary wheel carrier and the second sun wheel are disconnected from each other. The method then comprises the steps of connecting the output shaft of the combustion engine with the input shaft of the gearbox, and of starting the combustion engine as described previously.

According to another embodiment, a first planetary wheel carrier, arranged in the first planetary gear, and a first sun wheel are connected, and a second planetary wheel carrier, arranged in the second planetary gear, and a second sun wheel are also connected. Furthermore, the gear pair connected with the first planetary gear is disconnected from the countershaft, while a gear pair connected with the second planetary gear is connected with the countershaft. The method then comprises the step of disconnecting, before the step of connecting the output shaft of the combustion engine with the input shaft of the gearbox, the second planetary wheel carrier and the second sun wheel from each other. Preferably this is achieved by way of controlling the first and/or the second electrical machine in such a way that torque balance is achieved in the second planetary gear, wherein a second coupling device is shifted, so that the second planetary wheel carrier and the second sun wheel are disconnected from each other. The method preferably also comprises, after the combustion engine has been started, connecting a gear pair, which is connected with the first planetary gear, to the countershaft, in order thus to engage a gear and facilitate moving off. Suitably, the connection of the gear pair is carried out by controlling the combustion engine's engine speed to achieve a synchronous rotational speed between the gear pair connected with the first planetary gear and the countershaft.

According to another embodiment, a first planetary wheel carrier, arranged in the first planetary gear, and a first sun wheel are connected, and a second planetary wheel carrier, arranged in the second planetary gear, and a second sun wheel are also connected. Furthermore, the gear pairs connected with the first planetary gear are disconnected from the countershaft, while a gear pair, which is connected with the second planetary gear, is connected with the countershaft. The method then comprises the step of first disconnecting, before the step of connecting the output shaft of the combustion engine with the input shaft of the gearbox, the second planetary wheel carrier and the second sun wheel from each other. Preferably this is achieved by way of controlling the first and/or the second electrical machine in such a way that torque balance is achieved in the second planetary gear, wherein a second coupling device is shifted, so that the second planetary wheel carrier and the second sun wheel are disconnected from each other. Subsequently, a gear pair, which is connected with the first planetary gear, is connected to the countershaft. Suitably, the connection of the gear pair is carried out by controlling the first electrical machine to achieve a synchronous rotational speed between the gear pair connected with the first planetary gear and the countershaft. Subsequently, the first planetary wheel carrier and the first sun wheel are disconnected from each other. Preferably this is achieved by way of controlling the first and/or the second electrical machine in such a way that torque balance is achieved in the first planetary gear, whereat a first coupling devise is shifted, so that the first planetary wheel carrier and the first sun wheel are disconnected from each other. The method then comprises the steps of connecting the output shaft of the combustion engine with the input shaft of the gearbox, and of starting the combustion engine as described previously.

According to another embodiment, a first planetary wheel carrier, arranged in the first planetary gear, and a first sun wheel are disconnected from each other, and a second planetary wheel carrier, arranged in the second planetary gear, and a second sun wheel are also disconnected from each other. Furthermore, a gear pair connected with the first planetary gear is connected to the countershaft, and a gear pair connected with the second planetary gear is also connected with the countershaft. The method to start the combustion engine then comprises the steps of connecting the output shaft of the combustion engine with the input shaft of the gearbox, and of controlling the first and the second electrical machine, in such a way that the combustion engine is started.

According to one embodiment, the desired torque is achieved in the output shaft via a fifth gear pair, arranged between the output shaft and the countershaft.

The gearbox may be equipped with a number of gear pairs, comprising cogwheels that may be mechanically locked with and released from a countershaft. Preferably, the first main shaft and the second main shaft are connected to a transmission device, comprising a number of connectable and disconnectable gear pairs. The gear pairs comprise cogwheels, which are mechanically lockable with and disconnectable from the countershaft. Thus, a number of fixed gear steps is obtained, which may be shifted without torque interruption. The cogwheels that may be locked on the countershaft also result in a compact construction with a high reliability and high dependability. A gear pair may thus be disconnected, whereat the corresponding cogwheel is disconnected from the countershaft, and a gear pair may be connected, whereat the corresponding cogwheel is connected to the countershaft. Alternatively, pinion gears in the gear pairs may be arranged to be lockable with and disconnectable from the first or second main shaft.

Each of the gear pairs has a gearing, which is adapted to the vehicle's desired driving characteristics. The gear pair with the highest gearing, in relation to the other gear pairs, is suitably connected when the lowest gear is engaged.

The input shaft is connected with a planetary wheel carrier, arranged in the first planetary gear. The first planetary wheel carrier is connected with the combustion engine via a coupling device. The second planetary wheel carrier in the second planetary gear is preferably directly connected with the second main shaft, and therefore with the transmission device. Thus, a hybrid powertrain is achieved, which may transfer a large torque to the output shaft and the therewith connected driving wheels in all operating modes, without being dependent on electric power from the energy storage device.

The first planetary wheel carrier in the first planetary gear is preferably connected with the second sun wheel of the second planetary gear. The first sun wheel in the first planetary gear is preferably connected with the first main shaft, and the second planetary wheel carrier in the second planetary gear is preferably connected with the second main shaft. Thus, a transmission is obtained, which shifts gears without torque interruption. Alternatively, the first planetary wheel carrier in the first planetary gear is connected with the second internal ring gear of the second planetary gear. Alternatively, the first main shaft is connected with a first internal ring gear arranged in the first planetary gear.

By connecting a first planetary wheel carrier in the first planetary gear with a second sun wheel in the second planetary gear, connecting a first sun wheel in the first planetary gear with the first main shaft, and connecting a second planetary wheel carrier in the second planetary gear with the second main shaft, a transmission is obtained, which shifts without any torque interruption.

A first and second coupling device is arranged between the planetary wheel carrier and the sun wheel of the respective planetary gears. The task of the coupling devices is to lock the respective planetary wheel carriers with the sun wheel. When the planetary wheel carrier and the sun wheel are connected with each other, the power from the combustion engine will pass through the planetary wheel carrier, the coupling device, the sun wheel and further along to the gearbox, which entails that the planetary wheels do not absorb any torque. This entails that the dimension of the planetary wheels may be adapted only to the electrical machine's torque instead of the combustion engine's torque, which in turn means the planetary wheels may be designed with smaller dimensions. Thus, a drive arrangement according to the invention is obtained, which has a compact construction, a low weight and a low manufacturing cost.

The coupling devices and the locking mechanisms preferably comprise an annular sleeve, which is shifted axially between a connected and a disconnected state. The sleeve encloses, substantially concentrically, the gearbox's rotating components and is moved between the connected and disconnected state with a power element. Thus, a compact construction is obtained, with a low weight and a low manufacturing cost.

BRIEF DESCRIPTION OF THE DRAWINGS

Below is a description, as an example, of preferred embodiments of the invention with reference to the enclosed drawings, on which.

DETAILED DESCRIPTION OF PREFERRED EMBODIMENTS OF THE INVENTION

Figure 1:
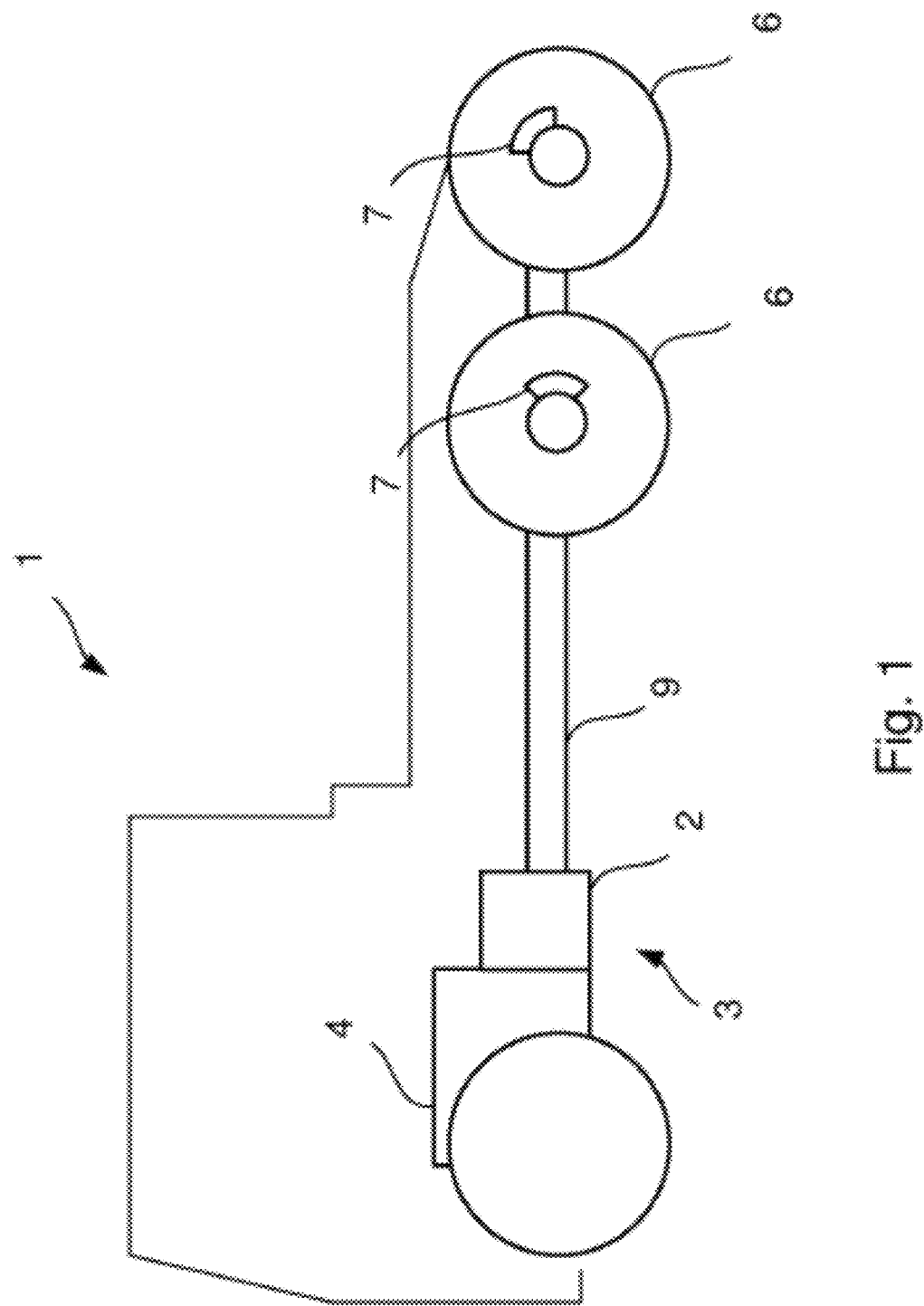
FIG. 1 shows a schematic side view of a vehicle, comprising a hybrid powertrain with a combustion engine, which is arranged to be started according to the method, according to the present invention.

FIG. 1 shows a schematic side view of a vehicle 1, comprising a gearbox 2 and a combustion engine 4, which are comprised in a hybrid powertrain 3. The combustion engine 4 is connected to the gearbox 2, and the gearbox 2 is further connected to the driving wheels 6 of the vehicle 1 via a propeller shaft 9. The driving wheels 6 are equipped with brake devices 7 to brake the vehicle 1.

Figure 2:
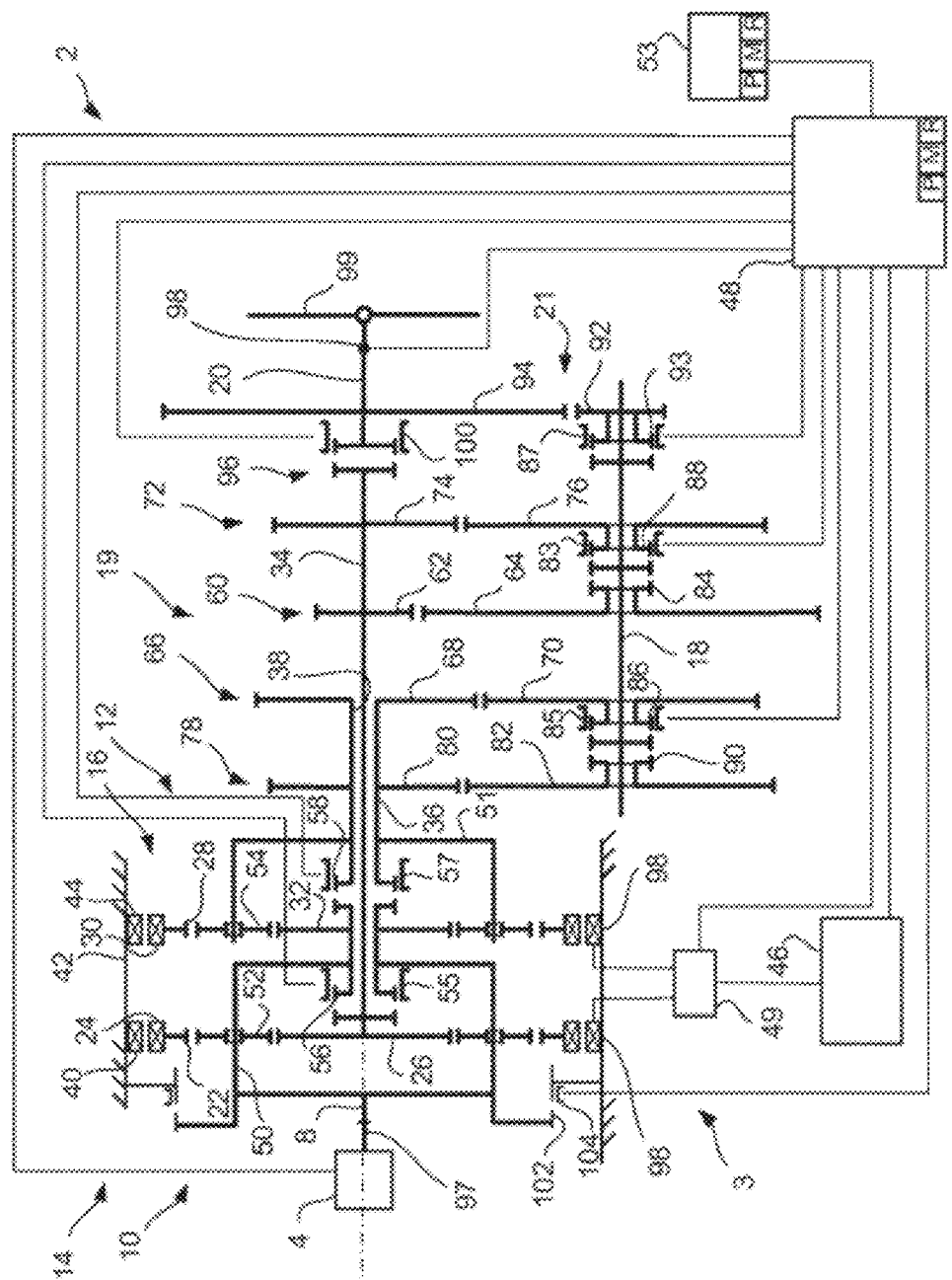
FIG. 2 shows a schematic side view of a hybrid powertrain with a combustion engine, which is arranged to be started according to the method, according to the present invention.

FIG. 2 shows a schematic side view of a hybrid powertrain 3 with a gearbox 2, comprising an input shaft 8, a first and a second planetary gear 10 and 12, respectively, a first and a second electrical machine 14 and 16, respectively, a countershaft 18 and an output shaft 20. The hybrid powertrain comprises a combustion engine 4, connected to the gearbox 2. The combustion engine 4 is connected with the gearbox 2 via the input shaft 8 of the gearbox. The combustion engine has an output shaft 97. The output shaft 97 of the combustion engine 4 is connected to the input shaft of the gearbox 2. The first planetary gear 10 has a first internal ring gear 22, to which a first rotor 24 in the first electrical machine 14 is connected. The first planetary gear 10 also has a first sun wheel 26 and a first planetary wheel carrier 50. The second planetary gear 12 has a second internal ring gear 28, to which a second rotor 30 of the second electrical machine 16 is connected. The second planetary gear 12 has a second sun wheel 32 and a second planetary wheel carrier 51. The first and the second sun wheels 26 and 32, respectively, are coaxially arranged, which, according to the embodiment displayed, entails that a first main shaft 34 arranged on the first sun wheel 26 extends inside a second main shaft 36, which is equipped with a central boring 38, arranged on the second planetary wheel carrier 51. It is also possible to arrange the first main shaft 34 in parallel with and next to the second main shaft 36. It is also possible to arrange the first and second sun wheels 26 and 32, respectively, in parallel with and next to each other. In this case, the countershaft 18 is suitably arranged between the first main shaft 34 and the second main shaft 36, and the torque may be extracted directly from the countershaft 18. The countershaft 18 thus constitutes, in this case, the output shaft 20.

The first electrical machine 14 is equipped with a first stator 40, which is connected to the vehicle 1, via a gear housing 42 surrounding the gearbox 2. The second electrical machine 16 is equipped with a second stator 44, which is connected to the vehicle 1, via a gear housing 42 surrounding the gearbox 2. The first and the second electrical machine 16 are connected to an energy storage device 46, such as a battery, which, depending on the vehicle's 1 operating mode, operates the electrical machines 14 and 16, respectively. At other operating modes, the electrical machines 14 and 16, respectively, may work as generators, wherein power is supplied to the energy storage device 46. An electronic control device 48 is connected to the energy storage device 46 and controls the supply of power to the electrical machines 14 and 16, respectively. Preferably the energy storage device 46 is connected to the electrical machines 14 and 16, respectively, via a switch 49, which is connected to the control device 48. In some operating modes, the electrical machines 14 and 16, respectively, may also operate each other. The electrical machines 14 and 16, respectively, may accordingly operate each other. Electric power is then led from one of the electrical machines 14, 16 to the second electrical machine 14, 16 via the switch 49, connected to the electrical machines 14, 16. Thus, it is possible to achieve a power balance between the electrical machines 14, 16. Another computer 53 may also be connected to the control device 48 and the gearbox 2.

The first planetary gear 10 is equipped with a first planetary wheel carrier 50, on which a first set of planetary wheels 52 is mounted. The second planetary gear 12 is equipped with a second planetary wheel carrier 51, on which a second set of planetary wheels 54 is mounted. The first set of planetary wheels 52 interacts with the first internal ring gear 22 and the first sun wheel 26. The second set of planetary wheels 54 interacts with the second internal ring gear 28 and the second sun wheel 32. The input shaft 8 of the gearbox 2 is connected with the first planetary wheel carrier 50. The input shaft 8 of the gearbox 2 is also connected with the output shaft 97 of the combustion engine 4 via a coupling device 106. By opening the coupling device 106, the combustion engine 4 may be disconnected from the gearbox 2 and the vehicle 1 may thus be operated electrically via the first and the second electrical machine 14, 16. The coupling device 106 may consist of splines-equipped sections, which interact with a coupling sleeve. Alternatively, the coupling device 106 may consist of a friction clutch.

A first coupling device 56 is arranged between the first sun wheel 26 and the first planetary wheel carrier 50. By arranging the first coupling device 56 in such a way that the first sun wheel 26 and the first planetary wheel carrier 50 are connected with each other, and may therefore not rotate in relation to each other, the first planetary wheel carrier 50 and the first sun wheel 26 will rotate with equal rotational speeds.

A second coupling device 58 is arranged between the second sun wheel 32 and the second planetary wheel carrier 51. By arranging the second coupling device 58 in such a way that the second sun wheel 32 and the second planetary wheel carrier 51 are connected with each other, and may therefore not rotate in relation to each other, the second planetary wheel carrier 51 and the first sun wheel 32 will rotate with equal rotational speeds.

Preferably, the first and second coupling devices 56, 58 comprise a first and a second splines-equipped coupling sleeve 55 and 57, respectively, which is axially shiftable on a splines-equipped section on the first and second, respectively, planetary wheel carrier 50 and 51, and on a splines-equipped section on the respective sun wheels 26 and 32. By shifting the respective coupling sleeve 55, 57 so that the splines-equipped sections are connected via the respective coupling sleeves 55, 57, the first planetary wheel carrier 50 and the first sun wheel 26, as well as the second planetary wheel carrier 51 and the second sun wheel 32, respectively, become mutually interlocked with each other and may not rotate in relation to each other.

The first and second coupling device 56, 58 according to the embodiment displayed in FIG. 2 are arranged between the first sun wheel 26 and the first planetary wheel carrier 50, and between the second sun wheel 28 and the second planetary wheel carrier 51, respectively. However, it is possible to arrange an additional or alternative coupling device (not displayed) between the first internal ring gear 22 and the first planetary wheel carrier 50, and also to arrange an additional or alternative coupling device (not displayed) between the second internal ring gear 28 and the second planetary wheel carrier 51.

The first planetary wheel carrier 50 in the first planetary gear 10 is, in this embodiment, fixedly connected with the second sun wheel 32 of the second planetary gear 12.

A transmission device 19, which comprises a first gear pair 60, arranged between the first planetary gear 10 and the output shaft 20 is connected to the first and the second main shaft 34, 36. The first gear pair 60 comprises a first pinion gear 62 and a first cogwheel 64, which are in engagement with each other. A second gear pair 66 is arranged between the second planetary gear 12 and the output shaft 20. The second gear pair 66 comprises a second pinion gear 68 and a second cogwheel 70, which are in engagement with each other. A third gear pair 72 is arranged between the first planetary gear 10 and the output shaft 20. The third gear pair 72 comprises a third pinion gear 74 and a third cogwheel 76, which are in engagement with each other. A fourth gear pair 78 is arranged between the second planetary gear 12 and the output shaft 20. The fourth gear pair 78 comprises a fourth pinion gear 80 and a fourth cogwheel 82, which are in engagement with each other.

On the first main shaft 34, the first and the third pinion gears 62 and 74, respectively, are arranged. The first and the third pinion gears 62 and 74, respectively, are fixedly connected with the first main shaft 34, so that they may not rotate in relation to the first main shaft 34. On the second main shaft 36, the second and the fourth pinion gears 68 and 80, respectively, are arranged. The second and the fourth pinion gears 68 and 80, respectively, are fixedly connected with the second main shaft 36, so that they may not rotate in relation to the second main shaft 36.

The countershaft 18 extends substantially in parallel with the first and the second main shaft 34 and 36, respectively. On the countershaft 18, the first, second, third and fourth cogwheels 64, 70, 76 and 82, respectively, are mounted. The first pinion gear 62 engages with the first cogwheel 64, the second pinion gear 68 engages with the second cogwheel 70, the third pinion gear 74 engages with the third cogwheel 76 and the fourth pinion gear 80 engages with the fourth cogwheel 82.

The first, second, third and fourth cogwheels 64, 70, 76 and 82, respectively, may be individually locked with and released from the countershaft 18 with the assistance of the first, second, third and fourth coupling elements 84, 86, 88 and 90, respectively. The coupling elements 84, 86, 88 and 90, respectively, preferably consist of splines-equipped sections on the cogwheels 64, 70, 76 and 82, respectively, and on the countershaft 18, which interact with fifth and sixth coupling sleeves 83, 85 which engage mechanically with the splines-equipped sections of the respective first to fourth cogwheel 64, 70, 76 and 82 and of the countershaft 18. The first and third coupling elements 84, 88 are preferably equipped with a common coupling sleeve 83, and the second and fourth coupling elements 86, 90 are preferably equipped with a common coupling sleeve 85. In the released state, a relative rotation may occur between the cogwheels 64, 70, 76 and 82 and of the countershaft 18. The coupling elements 84, 86, 88 and 90, respectively, may also consist of friction clutches. On the countershaft 18 a fifth cogwheel 92 is also arranged, which engages with a sixth cogwheel 94, which is arranged on the output shaft 20 of the gearbox 2.

The countershaft 18 is arranged between the respective first and second planetary gears 10, 12 and the output shaft 20, so that the countershaft 18 is connected with the output shaft 20 via a fifth gear pair 21, which comprises the fifth and the sixth cogwheel 92, 94. The fifth cogwheel 92 is arranged so it may be connected with and disconnected from the countershaft 18 with a fifth coupling element 93.

By disconnecting the fifth cogwheel 92, which is arranged to be disconnectable from the countershaft 18, it is possible to transfer torque from the second planetary gear 12 to the countershaft 18 via, for example, the second gear pair 66, and to further transfer torque from the countershaft 18 to the output shaft 20 via, for example, the first gear pair 60. Thus, a number of gear steps is obtained, wherein torque from one of the planetary gears 10, 12 may be transferred to the countershaft 18, and further along from the countershaft 18 to the main shaft 34, 36 connected with the second planetary gear 10, 12, finally to transfer torque to the output shaft 20 of the gearbox 2. This presumes, however, that a coupling mechanism 96 arranged between the first main shaft 34 and the output shaft 20 is connected, which is described in more detail below.

The fifth cogwheel 92 may be locked to and released from the countershaft 18 with the assistance of a fifth coupling element 93. The coupling element 93 preferably consists of splines-equipped sections adapted on the fifth cogwheel 92 and the countershaft 18, which sections interact with a ninth coupling sleeve 87, which engages mechanically with the splines-equipped sections of the fifth cogwheel 92 and the countershaft 18. In the released state, a relative rotation may occur between the fifth cogwheel 92 and the countershaft 18. The fifth coupling element 93 may also consist of friction clutches.

Torque transfer from the input shaft 8 of the gearbox 2 to the output shaft 20 of the gearbox 2 occurs via the first or the second planetary gear 10 and 12, respectively, and the countershaft 18. The torque transfer may also occur directly via the first planetary gear 10, whose first sun wheel 26 is connected, via the first main shaft 34, to the output shaft 20 of the gearbox 2 via a coupling mechanism 96. The coupling mechanism 96 preferably comprises a splines-equipped seventh coupling sleeve 100, which is axially shiftable on the first main shaft 34 and on the splines-equipped sections of the output shaft 20. By shifting the seventh coupling sleeve 100, so that the splines-equipped sections are connected via the seventh coupling sleeve 100, the first main shaft 34 becomes locked with the output shaft 20, which, when rotating, will therefore have the same rotational speed. By disconnecting the fifth cogwheel 92 of the fifth gear pair 21 from the countershaft 18, torque from the second planetary gear 12 may be transferred to the countershaft 18, and further along from the countershaft 18 to the first main shaft 34, connected with the first planetary gear 10, in order finally to transfer torque via the coupling mechanism 96 to the output shaft 20 of the gearbox 2.

During operation, the gearbox 2 may operate in such a way that one of the sun wheels 26 and 32, respectively, are locked with the first and the second planetary wheel carrier 50 and 51, respectively, with the help of the first and the second coupling device 56 and 58, respectively. The first and the second main shaft 34 and 36, respectively, then obtain the same rotational speed as the input shaft 8 of the gearbox 2, depending on which sun wheel 26 and 32, respectively, is locked with the respective planetary wheel carriers 50 and 51. One or both of the electrical machines 14 and 16, respectively, may operate as a generator to generate electric power to the energy storage device 46. Alternatively, the electrical machine 14 and 16, respectively, may provide a torque injection, in order to thus increase the torque in the output shaft 20. At some operating times, the electrical machines 14 and 16, respectively, will supply each other with electric power, independently of the energy storage device 46.

It is also possible that both the first and the second electrical machine 14 and 16, respectively, generate power to the energy storage device 46. At engine braking the driver releases the accelerator pedal (not displayed) of the vehicle 1. The output shaft 20 of the gearbox 2 then operates one or both electrical machines 14 and 16, respectively, while the combustion engine 4 and the electrical machines 14 and 16, respectively, engine brake. The electrical machines 14 and 16, respectively, in this case generate electric power, which is stored in the energy storage device 46 in the vehicle 1. This operating state is referred to as regenerative braking. Thus, only one of or both the electrical machines 14 and 16, respectively, will function as brakes and 16 generate electric power, which is stored in the energy storage device 46. The disconnection of the output shaft 97 of the combustion engine 4 may be carried out when the vehicle is to be operated by only one or both the electrical machines 14 and 16, respectively, with the combustion engine switched off. If the torque of one or both of the respective electrical machines 14 and 16 overcomes the torque off the combustion engine 4, and having regard to the gearing between them, the combustion engine 4 will not be able to resist the large torque which the respective electrical machines 14 and 16 generate, so that it becomes necessary to disconnect the output shaft 97 of the combustion engine 4.

The control device 48 is connected to the electrical machines 14 and 16, respectively, to control the respective electrical machines 14 and 16, so that they, during certain operating times, use stored electric power to supply driving power to the output shaft 20 of the gearbox 2, and during other operating times use the kinetic energy of the output shaft 20 of the gearbox 2 to extract and store electric power. The control device 48 thus detects the rotational speed and/or the torque of the output shaft 97 of the combustion engine 4 via sensors 98 arranged at the electrical machines 14 and 16, respectively, and in the output shaft 20 of the gearbox 2, in order thus to gather information and to control the electrical machines 14 and 16, respectively, to operate as electric motors or generators. The control device 48 may be a computer with software suitable for this purpose. The control device 48 also controls the flow of power between the energy storage device 46 and the respective stators 40 and 44 of the electrical machines 14 and 16, respectively. At times when the electrical machines 14 and 16, respectively, operate as engines, stored electric power is supplied from the energy storage device 46 to the respective stators 40 and 44. At times when the electrical machines 14 and 16 operate as generators electric power is supplied from the respective stators 40 and 44 to the energy storage device 46. However, as stated above, the electrical machines 14 and 16, respectively, may, during certain operating times, supply each other with electric power, independently of the energy storage device 46.

The first and the second coupling devices 56 and 58, respectively, the first, second, third, fourth and fifth coupling elements 84, 86, 88, 90 and 93, respectively, the coupling mechanism 96 between the first main shaft 34 and the output shaft 20, and the locking device 102 between the first planetary wheel carrier 50 and the gear housing 42, are connected to the control device 48 via their respective coupling sleeves. These components are preferably activated and deactivated by electric signals from the control device 48. The coupling sleeves are preferably shifted by non-displayed power elements, such as hydraulically or pneumatically operated cylinders. It is 104 also possible to shift the coupling sleeves with electrically powered power elements.

According to the example embodiment in FIG. 2 shows four pinion gears 62, 68, 74 and 80, respectively, and four cogwheels 64, 70, 76 and 82, respectively, and two respective planetary gears 10 and 12, with associated electrical machines 14 and 16, respectively. However, it is possible to adapt the gearbox 2 with more or fewer pinion gears and cogwheels, and with more planetary gears with associated electrical machines.

According to the embodiment above, the gearbox 2 comprises pinion gears 62, 68, 74, 80 and cogwheels 64, 70, 76, 82 arranged on the main shafts 34, 36 and the countershaft 18, respectively, to transfer rotational speed and torque.

However, it is possible to use another type of transmission, such as chain and belt drives, to transfer rotational speed and torque in the gearbox 2.

The transmission device 19 has four gear pairs 60, 66, 72, 78 according to the example embodiment. However, the transmission device 19 may comprise any number of gear pairs.

Figure 3:
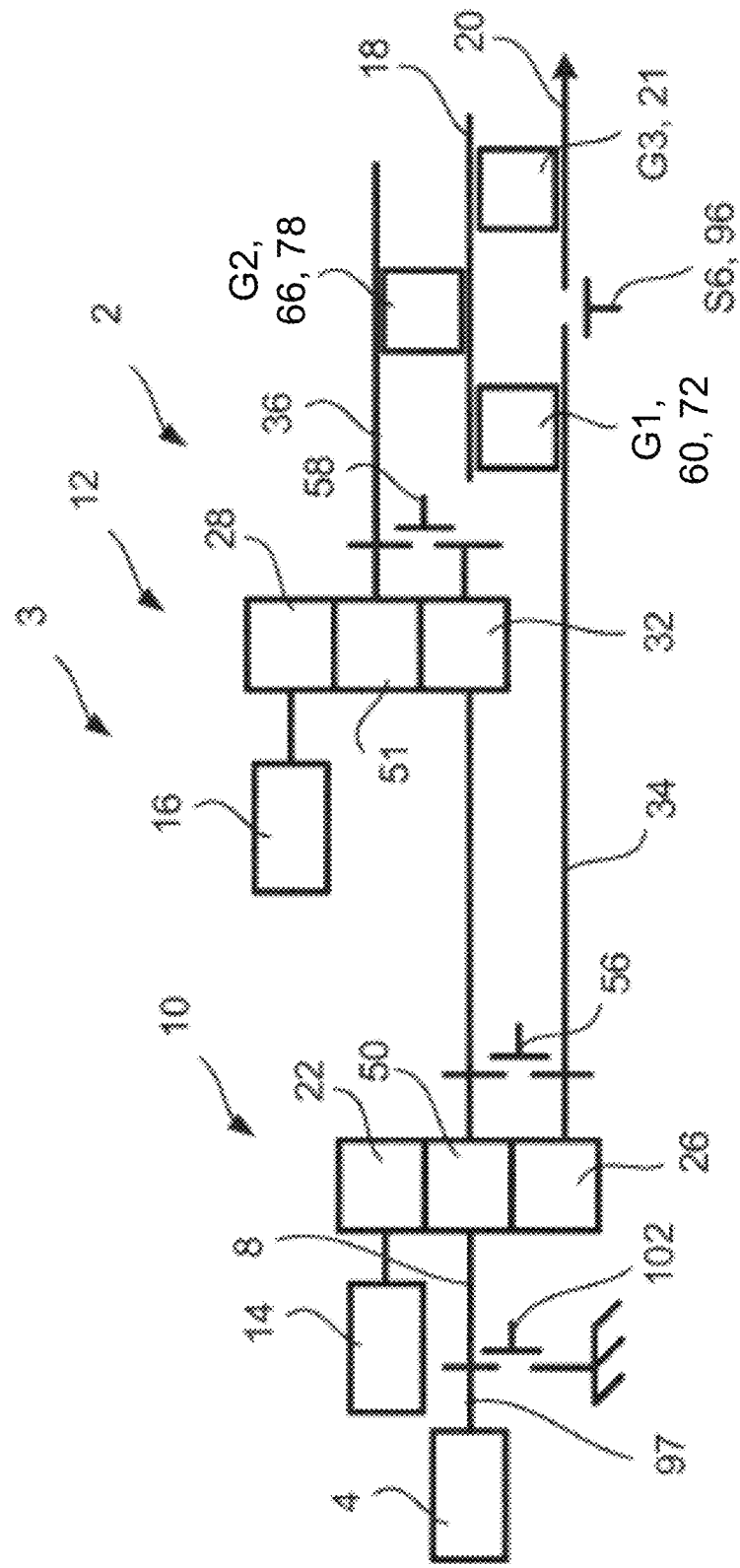
FIG. 3 shows a simplified schematic view of the hybrid powertrain in FIG. 2.

FIG. 3 illustrates the hybrid powertrain 3 according to FIG. 2 in a simplified view, where some components have been excluded in the interest of clarity. G1 in FIG. 3 consists of at least one gear pair connected with the first main shaft 34 and therefore with the first planetary gear 10, and a gear pair G2 consists of at least one gear pair connected with the second main shaft 36 and therefore with the second planetary gear 12. These gear pairs G1, G2 are also connected to the output shaft 20 via the countershaft 18. G1 and G2, respectively, may consist of one or several gear pairs. The gear pair G1, connected with the first planetary gear 10, may for example consist of the first gear pair 60 and/or the third gear pair 72, as described in FIG. 2. The gear pair G2, connected with the second planetary gear 12, may for example consist of the second gear pair 66 and/or the fourth gear pair 78, as described in FIG. 2. Further, at least one gear pair G3, connected with the output shaft 20 and the countershaft, 18 is displayed, which may consist of the fifth gear pair 21 described in FIG. 2. G3 may consist of one or several gear pairs.

Below, embodiments to start the combustion engine 4 are described.

According to one embodiment, the combustion engine 4 is disconnected from the input shaft 8 of the gearbox 2 via the coupling device 106, while simultaneously the first planetary wheel carrier 50 and the first sun wheel 26 are disconnected from each other, and the second planetary wheel carrier 51 is disconnected from the second sun wheel 32. A gear pair G1, which is connected with the first planetary gear 10, is connected to the countershaft 18, and a gear pair G2, which is connected with the second planetary gear 12, is also connected with the countershaft 18. The method to start the combustion engine 4 then comprises the step of connecting the output shaft 97 in the combustion engine 4 with the input shaft 8 of the gearbox 2, via the coupling device 106. The first and the second electrical machine 14, 16 is controlled in such a way that a synchronous rotational speed is achieved between the output shaft 97 of the combustion engine 4 and the input shaft 8 of the gearbox 2, following which the coupling device 106 is controlled in such a way that both shafts 97, 8 are connected. The method also comprises the step of controlling the first and the second electrical machine 14, 16, in such a way that the combustion engine 4 is started. This means that the first and second electrical machine 14, 16, respectively, is controlled in such a way that a sufficient torque $T_{Flywheel}$ is obtained on the shaft 97 to the combustion engine 4, while a predetermined desired torque $T_{drv}$ is achieved on the output shaft 20 of the gearbox. How the first and the second electrical machine 14, 16, respectively, is controlled, is determined by way of balancing between the desired torque $T_{drv}$ in the output shaft 20 and the required torque $T_{Flywheel}$ to start the combustion engine 4, for the selected gear. The torque $T_{Flywheel}$, obtained in the combustion engine 4, is determined by the equation E1 below:

$$T_{Flywheel} = T_{EM1}\frac{S_1 + R_1}{R_1} - T_{EM2}\frac{S_2}{R_2} \quad [E1]$$

$T_{EM1}$ is the torque emitted by the first electrical machine 14, and $T_{EM2}$ is the torque emitted by the second electrical machine 16, $S_1$ is the number of cogs on the first sun wheel 26, $R_1$ is the number of cogs on the first ring gear 22, $S_2$ is the number of cogs on the second sun wheel, and $R_2$ is the number of cogs on the second ring gear 28. In cases where the gear pair G3, which is connected with the countershaft 18 and the output shaft 20, is connected and locked on the countershaft 18, and a coupling mechanism S6, 96, arranged between the first main shaft 34 and the output shaft 20 is open, the torque $T_{drv}$ desired in the output shaft 20 of the gearbox, also referred to as the powertrain torque, may be obtained through a combination of torque from the first and the second electrical machines 14, 16, according to the equation E2 below:

$$T_{Drv} = -T_{EM1}\frac{S_1}{R_1}\frac{1}{G_1 G_3} + T_{EM2}\frac{S_2 + R_2}{R_2}\frac{1}{G_2 G_3} \quad [E2]$$

$G_1$ is the gear ratio between the first main shaft 34 and the countershaft 18, $G_2$ is the gear ratio between the second main shaft 36 and the countershaft 18, and $G_3$ is the gear ratio between the countershaft 18 and the output shaft 20, for the selected connected gear pairs G1, G2, G3.

In cases where the gear pair G3, which is connected with the countershaft 18 and the output shaft 20, is disconnected from the countershaft 18, and the coupling mechanism S6, 96 is locked and thus connects the first main shaft 34 and the output shaft 20, the torque $T_{drv}$ in the output shaft 20 of the gearbox is determined by the equation E2' below:

$$T_{Drv} = -T_{EM1}\frac{S_1}{R_1} + T_{EM2}\frac{S_2 + R_2}{R_2}\frac{G_1}{G_2} \quad [E2']$$

With predetermined values for the torque $T_{Flywheel}$, required to start the combustion engine 4, and the desired powertrain torque $T_{dvr}$, the two equations E1, E2 or alternatively E1, E2' may be solved in order to determine what torque the first and the second electrical machine 14, 16, respectively, must achieve. In this way, the combustion engine 4 may be started at the same time as the hybrid powertrain is operated electrically.

According to another embodiment, the combustion engine 4 is disconnected via the coupling device 106, while simultaneously the first planetary wheel carrier 50 is connected with the first sun wheel 26, and the second planetary wheel carrier 51 is disconnected from the second sun wheel 32. Alternatively, the first planetary wheel carrier 50 and the first sun wheel 26 are disconnected from each other, and the second planetary wheel carrier 51 and the second sun wheel 32 are connected. A gear pair G1, which is connected with the first planetary gear 10, is connected to the countershaft, and a gear pair G2, which is connected with the second planetary gear 12, is also connected with the countershaft. The fifth gear pair G3 is suitably connected and locked on the countershaft 18. The method of starting the combustion engine 4 then comprises the step of disconnecting the first planetary wheel carrier 50 and the first sun wheel 26 from each other, or alternatively of disconnecting the second planetary wheel carrier 51 and the second sun wheel 32 from each other, depending on which are connected. The disconnection is achieved by way of controlling the first and/or the second electrical machine 14, 16 in such a way that torque balance is achieved in the current planetary gear 10, 12, following which a coupling device 56, 58 is shifted, so that the planetary wheel carrier 50, 51 and the sun wheel 26, 32 are disconnected from each other. Subsequently, the output shaft 97 of the combustion engine 4 is connected with the input shaft 8 of the gearbox 2, via the coupling device 106, and the first and the second electrical machines 14, 16 are controlled to start the combustion engine 4 in accordance with the embodiment described above.

According to another embodiment, the combustion engine 4 is disconnected from the input shaft 8 of the gearbox 2 via the coupling device 106, while simultaneously the first planetary wheel carrier 50 is connected with the first sun wheel 26, and the second planetary wheel carrier 51 is connected with the second sun wheel 32. A gear pair G1, which is connected with the first planetary gear 10, is connected to the countershaft 18, and the gear pairs G2, which are connected with the second planetary gear 12, are disconnected from the countershaft 18. The fifth gear pair G3 is suitably connected and locked on the countershaft 18. The method then comprises the step of disconnecting the first planetary wheel carrier 50, arranged in the first planetary gear 10, and the first sun wheel 26 from each other. This is achieved by way of controlling the first and/or the second electrical machine 14, 16 in such a way that torque balance is achieved in the first planetary gear 10, wherein the first coupling device 56 is shifted, so that the first planetary wheel carrier 50 and the first sun wheel 26 are disconnected from each other. The method also comprises the step of connecting a gear pair G2, which is connected with the second planetary gear 12, to the countershaft 18. The second electrical machine 16 is controlled in such a way that a synchronous rotational speed is achieved between the gear pair G2, connected with the second planetary gear 12, and the countershaft 18. Subsequently, a coupling element (for example 86, 90) is controlled in such a way that the gear pair G2 is connected to the countershaft 18. The method also comprises the step of disconnecting the second planetary wheel carrier 51 and the second sun wheel 32 from each other, by way of controlling the first and/or the second electrical machine 14, 16 in such a way that torque balance is achieved in the second planetary gear 12, wherein the second coupling device 58 is shifted, so that the second planetary wheel carrier 51 and the second sun wheel 32 are disconnected from each other. The method also comprises the steps to subsequently connecting the output shaft 97 of the combustion engine 4 with the input shaft 8 of the gearbox 2, via the coupling device 106, and controlling the first and the second electrical machines 14, 16 to start the combustion engine 4 in accordance with the embodiments described above.

According to another embodiment, the combustion engine 4 is disconnected from the input shaft 8 of the gearbox 2 via the coupling device 106, while simultaneously the first planetary wheel carrier 50 is connected with the first sun wheel 26, and the second planetary wheel carrier 51 is connected with the second sun wheel 32. A gear pair G1, which is connected with the first planetary gear 10, is connected to the countershaft 18, and the gear pairs G2, which are connected with the second planetary gear 12, are disconnected from the countershaft 18. The fifth gear pair G3 is suitably connected and locked on the countershaft 18. The method then comprises the step of disconnecting the first planetary wheel carrier 50, arranged in the first planetary gear 10, and the first sun wheel 26 from each other. This is achieved by way of controlling the first and/or the second electrical machine 14, 16 in such a way that torque balance is achieved in the first planetary gear 10, wherein the first coupling device 56 is shifted, so that the first planetary wheel carrier 50 and the first sun wheel 26 are disconnected from each other. The method also comprises the steps of connecting the output shaft 97 of the combustion engine 4 with the input shaft 8 of the gearbox 2, via the coupling device 106, and of controlling the first and the second electrical machines 14, 16 to start the combustion engine 4 in accordance with the embodiments described above, with the difference that the second electrical machine 16 has no impact in the equations E2 and E2'. The method also suitably comprises the step of connecting a gear pair G2, which is connected with the second planetary gear 12, to the countershaft 18. The combustion engine 4 is thus controlled in such a way that a synchronous rotational speed is achieved between the gear pair G2, connected with the second planetary gear 12, and the countershaft 18. Subsequently, a coupling element (for example 86, 90) is controlled in such a way that the gear pair G2 is connected to the countershaft 18. Thus, moving off is facilitated after the combustion engine has been started.

According to another embodiment, the combustion engine 4 is disconnected from the input shaft 8 of the gearbox 2 via the coupling device 106, while simultaneously the first planetary wheel carrier 50 is connected with the first sun wheel 26, and the second planetary wheel carrier 51 is connected with the second sun wheel 32. A gear pair G2, which is connected with the second planetary gear 12, is connected to the countershaft 18, and the gear pairs G1, connected with the first planetary gear 10, are disconnected from the countershaft 18. The fifth gear pair G3 is suitably connected and locked on the countershaft 18. The method comprises the steps of disconnecting the second planetary wheel carrier 51, arranged in the second planetary gear 12, and the second sun wheel 32, from each other. This is achieved by way of controlling the first and/or the second electrical machine 14, 16 in such a way that torque balance is achieved in the second planetary gear 12, wherein the second coupling device 58 is shifted, so that the second planetary wheel carrier 51 and the second sun wheel 32 are disconnected from each other. The method also comprises the step of connecting a gear pair G1, which is connected with the first planetary gear 10, to the countershaft 18. The first electrical machine 14 is controlled in such a way that a synchronous rotational speed is achieved between the gear pair G1, connected with the first planetary gear 10, and the countershaft 18. Subsequently, a coupling element (for example 84, 88) is controlled in such a way that the gear pair G1 is connected to the countershaft 18. The method also comprises the step of disconnecting the first planetary wheel carrier 50 and the first sun wheel 26 from each other, by way of controlling the first and/or the second electrical machine 14, 16 in such a way that torque balance is achieved in the first planetary gear 10, wherein the first coupling device 56 is shifted, so that the first planetary wheel carrier 50 and the first sun wheel 26 are disconnected from each other. The method also comprises the steps to subsequently connecting the output shaft 97 of the combustion engine 4 with the input shaft 8 of the gearbox 2, via the coupling device 106, and controlling the first and the second electrical machines 14, 16 to start the combustion engine 4 in accordance with the embodiments described above.

According to another embodiment, the combustion engine 4 is disconnected from the input shaft 8 of the gearbox 2 via the coupling device 106, while simultaneously the first planetary wheel carrier 50 is connected with the first sun wheel 26, and the second planetary wheel carrier 51 is connected with the second sun wheel 32. A gear pair G2, which is connected with the second planetary gear 12, is connected to the countershaft 18, and the gear pairs G1, connected with the first planetary gear 10, are disconnected from the countershaft 18. The fifth gear pair G3 is suitably connected and locked on the countershaft 18. The method then comprises the step of disconnecting the second planetary wheel carrier 51, arranged in the second planetary gear 12, and the second sun wheel 32, from each other. This is achieved by way of controlling the first and/or the second electrical machine 14, 16 in such a way that torque balance is achieved in the second planetary gear 12, wherein the second coupling device 58 is shifted, so that the second planetary wheel carrier 51 and the second sun wheel 32 are disconnected from each other. The method then comprises the steps of connecting the output shaft 97 of the combustion engine 4 with the input shaft 8 of the gearbox 2, via the coupling device 106, and of controlling the first and the second electrical machines 14, 16 to start the combustion engine 4 in accordance with the embodiments described above, with the difference that the first electrical machine 14 has no impact in the equations E2 and E2'. The method also suitably comprises the step of connecting a gear pair G1, which is connected with the first planetary gear 10, to the countershaft 18. The combustion engine 4 is thus controlled in such a way that a synchronous rotational speed is achieved between the gear pair G1, connected with the first planetary gear 10, and the countershaft 18. Subsequently, a coupling element (for example 84, 88) is controlled in such a way that the gear pair G1 is connected to the countershaft 18. Thus, moving off is facilitated after the combustion engine has been started.

Figure 4A:
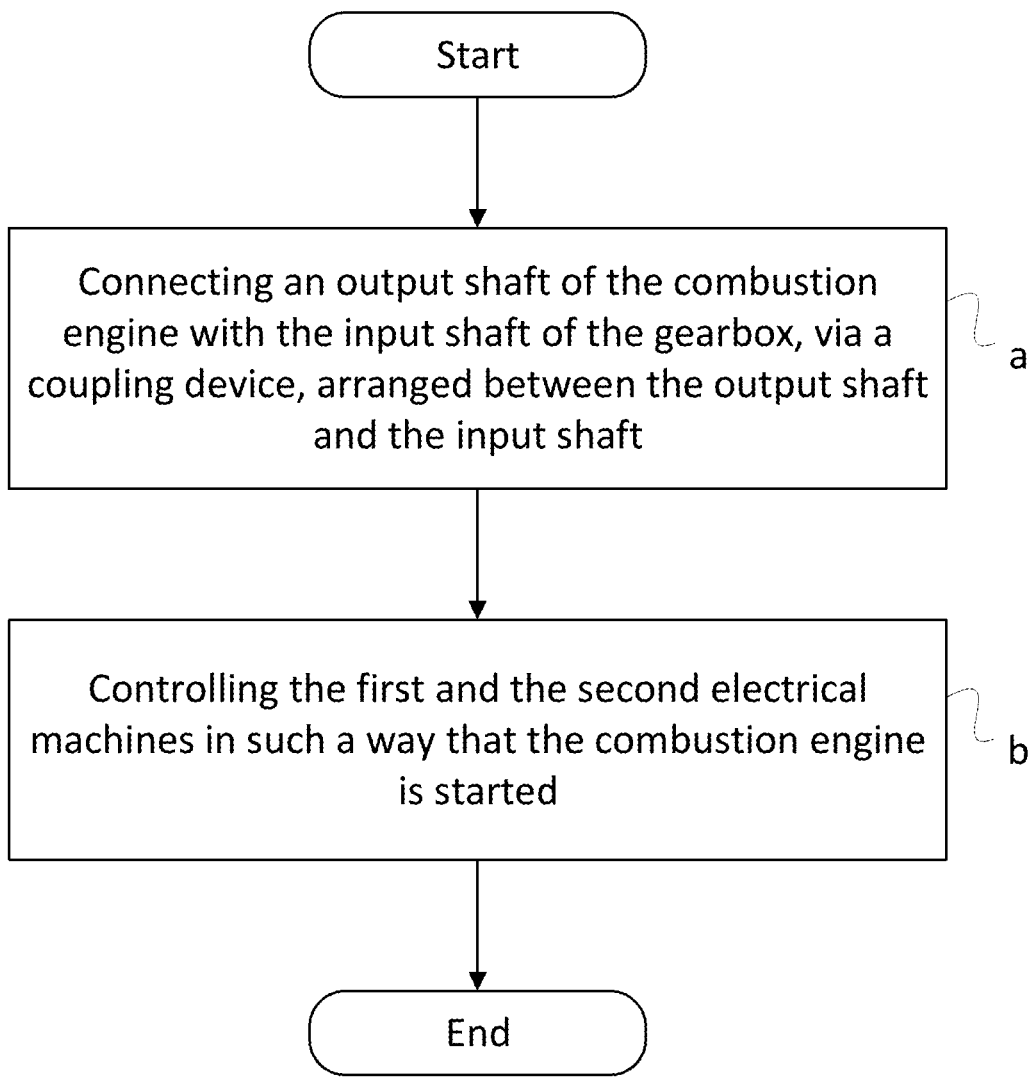
FIG. 4a-4c shows flow charts of methods to start a combustion engine in a hybrid powertrain according to the present invention.

FIG. 4a shows a method to start a combustion engine 4 in a hybrid powertrain 3, comprising a gearbox 2 with an input shaft 8 and an output shaft 20; a first planetary gear 10, connected to the input shaft 8 and a first main shaft 34; a second planetary gear 12, connected to the first planetary gear 10 and a second main shaft 36; a first electrical machine 14, connected to the first planetary gear 10; a second electrical machine 16, connected to the second planetary gear 12; at least one gear pair G1, 60, 72, connected with the first main shaft 34, and therefore to the first planetary gear 10 and the output shaft 20; and at least one gear pair G2, 66, 78, connected with the second main shaft 36, and therefore with the second planetary gear 12 and the output shaft 20, wherein the input shaft 8 is connected with a planetary wheel carrier 50, arranged in the first planetary gear 10, and the second main shaft 36 is connected with a planetary wheel carrier 51, arranged in the second planetary gear 12, the method comprising the steps:

a) connecting an output shaft 97 of the combustion engine 4 with the input shaft 8 of the gearbox 2, via a coupling device 106, arranged between the output shaft 97 and the input shaft 8; and
b) controlling the first and the second electrical machine 14, 16 in such a way that the combustion engine 4 is started.

Suitably, the output shaft 97 of the combustion engine 4 is connected with the input shaft 8 of the gearbox 2, by way of controlling the first electrical machine 14 in such a way that asynchronous rotational speed is achieved between the output shaft 97 of the combustion engine 4 and the input shaft 8 of the gearbox 2. Since the output shaft 97 of the combustion engine 4 is at a standstill when the coupling device 106 is open, the first electrical machine 14 is controlled in such a way that the input shaft 8 of the gearbox 2 stops. When the input shaft 8 has stopped, the coupling device 106 is controlled in such a way that the output shaft 97 of the combustion engine 4 and the input shaft 8 of the gearbox 2 are connected.

The combustion engine is preferably started by way of controlling the first and second electrical machines 14, 16, in such a way that a torque $T_{Flywheel}$, required to start the combustion engine 4, is achieved on the output shaft 97 of the combustion engine 4, while simultaneously a predetermined desired torque $T_{drv}$ is achieved on the output shaft 20 of the gearbox 2. How the first and the second electrical machine 14, 16, respectively, is controlled, is determined by way of balancing between the desired torque $T_{drv}$ in the output shaft 20 and the required torque $T_{Flywheel}$ to start the combustion engine 4, for the selected gear.

Figure 4B:
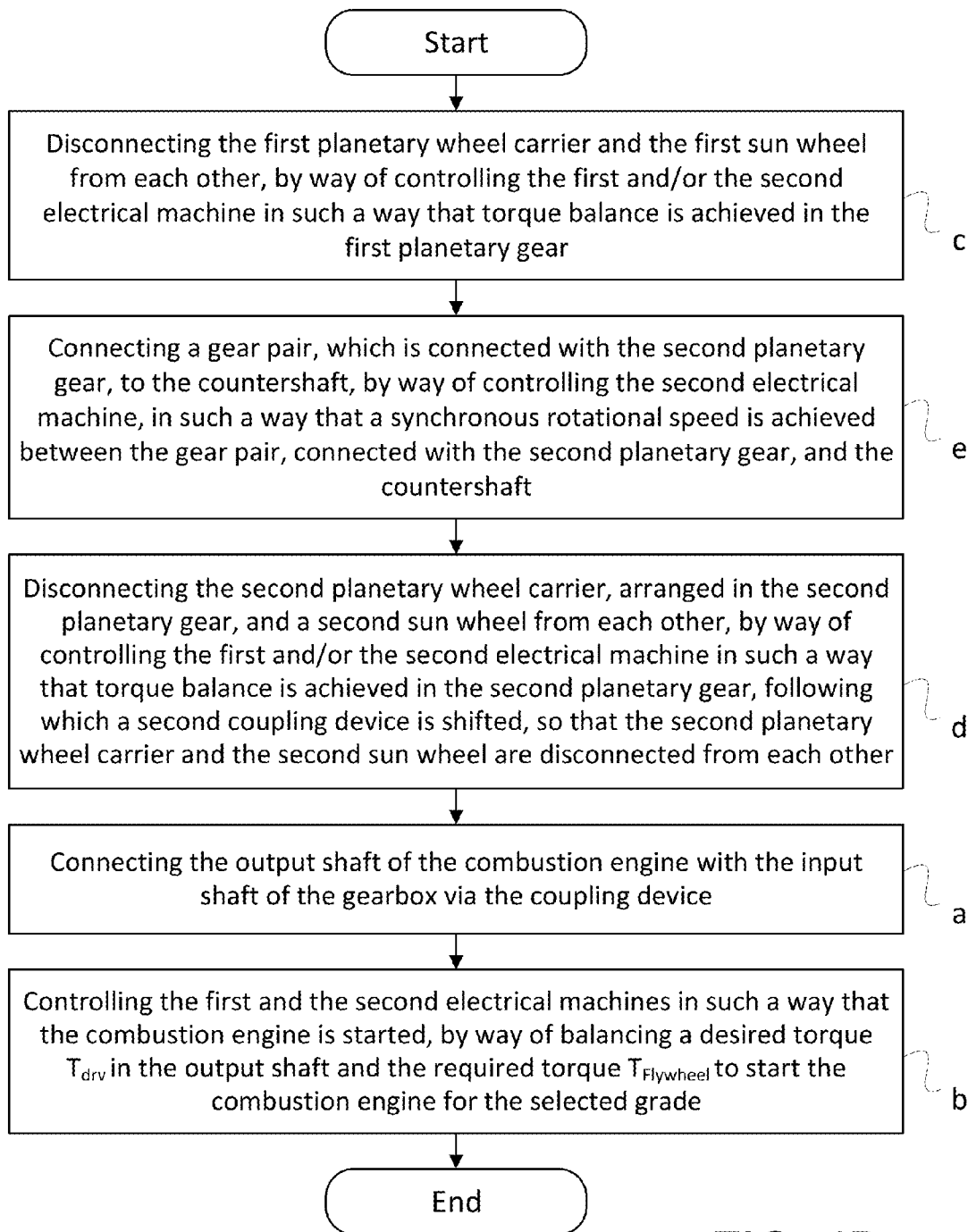

FIG. 4b shows a flow chart relating to a method to start a combustion engine 4 in a hybrid powertrain 3, wherein the first sun wheel 26, arranged in the first planetary gear 10, and the first planetary wheel carrier 50 are connected, and a second sun wheel 32, arranged in the second planetary gear 12, and the second planetary wheel carrier 51 are connected. The gear pair G1, 60, 72, which is connected with the first planetary gear 10, is connected to the countershaft 18 via the coupling element 84, 88 (see FIG. 2) and the gear pair G2, 66, 78, which is connected with the second planetary gear 12, is disconnected from the countershaft 18. The combustion engine 4 is disconnected from the input shaft 8 of the gearbox 2 by way of a coupling device 106, arranged between the output shaft 97 of the combustion engine 4 and the input shaft 8 of the gearbox 2. The combustion engine 4 is thus at a standstill.

The method to start the combustion engine 4 comprises the step c) of disconnecting the first planetary wheel carrier 50 and the first sun wheel 26 from each other, by way of controlling the first and/or the second electrical machine 14, 16 in such a way that torque balance is achieved in the first planetary gear 10. Subsequently, a second coupling device 56 is shifted, so that the first planetary wheel carrier 50 and the first sun wheel 26 are disconnected from each other.

The method also comprises the step e) of connecting a gear pair G2, 66, 78, which is connected with the second planetary gear 12, to the countershaft 18, by way of controlling the second electrical machine 16, in such a way that a synchronous rotational speed is achieved between the gear pair G2, 66, 78, connected with the second planetary gear 12, and the countershaft 18. Subsequently, a coupling element (for example 86 or 90) is controlled in such a way that the gear pair G2, 66, 78 is connected to the countershaft 18.

The method then comprises the step d) of disconnecting the second planetary wheel carrier 51, arranged in the second planetary gear 12, and a second sun wheel 32 from each other, by way of controlling the first and/or the second electrical machine 14, 16 in such a way that torque balance is achieved in the second planetary gear 12, following which a second coupling device 58 is shifted, so that the second planetary wheel carrier 51 and the second sun wheel 32 are disconnected from each other.

The method then comprises the step a) of connecting the output shaft 97 of the combustion engine 4 with the input shaft 8 of the gearbox 2 via the coupling device 106. The first electrical machine 14 is controlled in such a way that a synchronous rotational speed is achieved between the output shaft 97 of the combustion engine 4 and the input shaft 8 of the gearbox 2, following which the coupling device 106 is controlled in such a way that the output shaft 97 of the combustion engine 4 and the input shaft 8 of the gearbox 2 are connected.

The method also comprises the step b) of controlling the first and the second electrical machine 14, 16 in such a way that the combustion engine 4 is started, by way of balancing a desired torque $T_{drv}$ in the output shaft 20 and the required torque $T_{Flywheel}$ to start the combustion engine 4, for the selected gear.

Figure 4C:
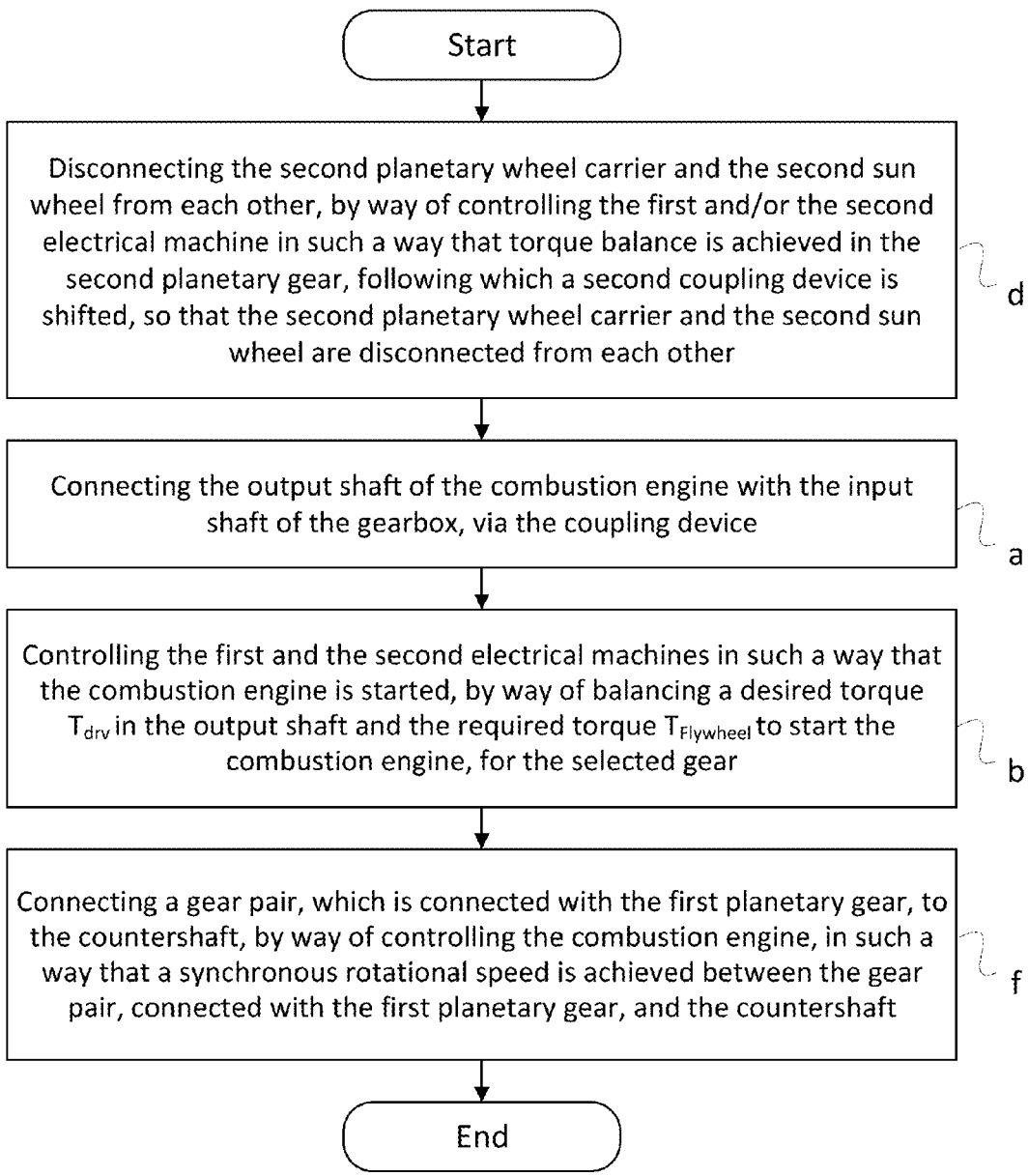

FIG. 4c shows a flow chart relating to a method to start a combustion engine 4 in a hybrid powertrain 3, wherein the first sun wheel 26, arranged in the first planetary gear 10, and the first planetary wheel carrier 50 are connected, and a second sun wheel 32, arranged in the second planetary gear 12, and the second planetary wheel carrier 51 are connected. The gear pair G1, 60, 72, which is connected with the first planetary gear 10, is disconnected from the countershaft 18 while the gear pair G2, 66, 78, which is connected with the second planetary gear 12, is connected with the countershaft 18 via coupling elements 86, 90 (see FIG. 2). The combustion engine 4 is disconnected from the input shaft 8 of the gearbox 2 by way of a coupling device 106, arranged between the output shaft 97 of the combustion engine 4 and the input shaft 8 of the gearbox 2. The combustion engine 4 is thus at a standstill.

The method of starting the combustion engine 4 comprises the step d) of disconnecting the second planetary wheel carrier 51 and the second sun wheel 32 from each other, by way of controlling the first and/or the second electrical machine 14, 16 in such a way that torque balance is achieved in the second planetary gear 12, following which a second coupling device 58 is shifted, so that the second planetary wheel carrier 51 and the second sun wheel 32 are disconnected from each other.

The method then comprises the step a) of connecting the output shaft 97 of the combustion engine 4 with the input shaft 8 of the gearbox 2, via the coupling device 106. The first electrical machine 14 is controlled in such a way that a synchronous rotational speed is achieved between the output shaft 97 of the combustion engine 4 and the input shaft 8 of the gearbox 2, following which the coupling device 106 is controlled in such a way that the output shaft 97 of the combustion engine 4 and the input shaft 8 of the gearbox 2 are connected.

The method also comprises the step b) of controlling the first and the second electrical machine 14, 16 in such a way that the combustion engine 4 is started, by way of balancing a desired torque $T_{drv}$ in the output shaft 20 and the required torque $T_{Flywheel}$ to start the combustion engine 4, for the selected gear.

With reference to FIG. 4c, after the combustion engine 4 has been started, the method suitably comprises the step f) of connecting a gear pair G1, 60, 72, which is connected with the first planetary gear 10, to the countershaft 18, by way of controlling the combustion engine 4, in such a way that a synchronous rotational speed is achieved between the gear pair G1, 60 72, connected with the first planetary gear 10, and the countershaft 18. In this way moving off is facilitated.

According to the invention, a computer program P is provided, stored in the control device 48 and/or the computer 53, which computer program may comprise procedures to start the combustion engine 4 according to the present invention.

The program P may be stored in an executable manner, or in a compressed manner, in a memory M and/or a read/write memory R.

The invention also relates to a computer program product, comprising program code stored in a medium readable by a computer, in order to perform the method steps specified above, when said program code is executed in the control device 48, or in another computer 53 connected to the control device 48. Said program code may be stored in a non-volatile manner on said medium readable by a computer 53.

The components and features specified above may, within the framework of the invention, be combined between different embodiments specified.

The invention claimed is:

1. A method to start a combustion engine in a hybrid powertrain, comprising a gearbox with an input shaft and an output shaft; a first planetary gear, connected to the input shaft and a first main shaft; a second planetary gear, connected to the first planetary gear and a second main shaft; a first electrical machine, connected to the first planetary gear; a second electrical machine, connected to the second planetary gear; at least one gear pair, connected with the first main shaft, and therefore with the first planetary gear and the output shaft; at least one gear pair, connected with the second main shaft, and therefore with the second planetary gear and the output shaft; and a coupling device arranged between an output shaft of the combustion engine and the input shaft of the gear-box, wherein the input shaft is connected with a first planetary wheel carrier, arranged in the first planetary gear, and wherein the second main shaft is directly connected with a second planetary wheel carrier, arranged in the second planetary gear, said method comprising the steps:
   a) connecting the output shaft of the combustion engine with the input shaft of the gearbox, via the coupling device, wherein connecting the output shaft of the combustion engine with the input shaft of the gearbox comprises controlling the first electrical machine such that the input shaft of the gearbox stops, and controlling the second electrical machine such that a desired torque in the output shaft is achieved; and
   b) controlling the first and the second electrical machine in such a way that the combustion engine is started, by balancing the desired torque in the output shaft and a required toque to start the combustion engine, for a selected gear.

2. The method according to claim 1, wherein in step a) controlling the first electrical machine in such a way that a synchronous rotational speed is achieved between the output shaft of the combustion engine and the input shaft of the gearbox, following which the coupling device is controlled in such a way that the output shaft and the input shaft are connected.

3. The method according to claim 1, further comprising before step a):
   c) disconnecting the first planetary wheel carrier, arranged in the first planetary gear, and the first sun wheel, from each other.

4. The method according to claim 3, wherein in step c) controlling the first and/or the second electrical machine in such a way that torque balance is achieved in the first planetary gear, following which a first coupling device is shifted, so that the first planetary wheel carrier and a first sun wheel are disconnected from each other.

5. The method according to claim 1, further comprising before step a):
   d) disconnecting the second planetary wheel carrier, arranged in the second planetary gear, and the second sun wheel, from each other.

6. The method according to claim 5, wherein, in step d) controlling the first and/or the second electrical machine in such a way that torque balance is achieved in the second planetary gear, following which a second coupling device is shifted, so that the second planetary wheel carrier and a second sun wheel are disconnected from each other.

7. The method according to claim 5, further comprising before step d):
c) disconnecting the first planetary wheel carrier, arranged in the first planetary gear, and the first sun wheel, from each other; and subsequently
e) connecting a gear pair, which is connected with the second planetary gear, to a countershaft, which is connected with the output shaft.

8. The method according to claim 7, wherein in step e) controlling the second electrical machine, in such a way that a synchronous rotational speed is achieved between the gear pair connected with the second planetary gear and the countershaft.

9. The method according to claim 1, further comprising: before step a):
d) disconnecting a second planetary wheel carrier, arranged in the second planetary gear, and a second sun wheel, from each other; and
after step b):
f) connecting a gear pair, which is connected with the first planetary gear to a countershaft, which is connected with the output shaft.

10. The method according to claim 9, wherein in step f) controlling the first electrical machine in such a way that a synchronous rotational speed is achieved between the gear pair connected with the first planetary gear and the countershaft.

11. The method according to claim 1, wherein the desired torque is achieved in the output shaft via a fifth gear pair, arranged between the output shaft and the countershaft.

12. A vehicle comprising a hybrid drive line, said hybrid drive line comprising:
a gearbox with an input shaft and an output shaft;
a first planetary gear, connected to the input shaft and a first main shaft;
a second planetary gear, connected to the first planetary gear and a second main shaft;
a first electrical machine, connected to the first planetary gear;
a second electrical machine, connected to the second planetary gear;
at least one gear pair, connected with the first main shaft, and therefore with the first planetary gear and the output shaft;
at least one gear pair, connected with the second main shaft, and therefore with the second planetary gear and the output shaft;
a coupling device arranged between an output shaft of the combustion engine and the input shaft of the gear-box, wherein the combustion engine is connected with a first planetary wheel carrier, arranged in the first planetary gear via the input shaft, and wherein the second main shaft is directly connected with a second planetary wheel carrier, arranged in the second planetary gear; and
an electric control device configured to:
a) connect the output shaft of the combustion engine with the input shaft of the gearbox, via the coupling device, wherein connecting the output shaft of the combustion engine with the input shaft of the gearbox comprises controlling the first electrical machine such that the input shaft of the gearbox stops, and controlling the second electrical machine such that a desired torque in the output shaft is achieved; and
b) control the first and the second electrical machine in such a way that the combustion engine is started, by balancing the desired torque in the output shaft and a required toque to start the combustion engine, for a selected gear.

13. A computer program product comprising computer program code stored on a non-transitory computer readable medium readable by a computer, said computer program product used to start a combustion engine in a hybrid powertrain, comprising a gearbox with an input shaft and an output shaft; a first planetary gear, connected to the input shaft and a first main shaft; a second planetary gear, connected to the first planetary gear and a second main shaft; a first electrical machine, connected to the first planetary gear; a second electrical machine, connected to the second planetary gear; at least one gear pair, connected with the first main shaft, and therefore with the first planetary gear and the output shaft; at least one gear pair, connected with the second main shaft, and therefore with the second planetary gear and the output shaft; and a coupling device arranged between an output shaft of the combustion engine and the input shaft of the gear-box, wherein the input shaft is connected with a first planetary wheel carrier, arranged in the first planetary gear, and wherein the second main shaft is directly connected with a second planetary wheel carrier, arranged in the second planetary gear,
said computer program code comprising computer instructions to cause one or more computer processors to perform the operations of:
a) connecting the output shaft of the combustion engine with the input shaft of the gearbox, via the coupling device, wherein connecting the output shaft of the combustion engine with the input shaft of the gearbox comprises controlling the first electrical machine such that the input shaft of the gearbox stops, and controlling the second electrical machine such that a desired torque in the output shaft is achieved; and
b) controlling the first and the second electrical machine in such a way that the combustion engine is started, by balancing the desired torque in the output shaft and a required toque to start the combustion engine, for a selected gear.

* * * * *